(12) United States Patent
Fadell et al.

(10) Patent No.: US 7,714,265 B2
(45) Date of Patent: May 11, 2010

(54) INTEGRATED PROXIMITY SENSOR AND LIGHT SENSOR

(75) Inventors: Anthony M. Fadell, Portola Valley, CA (US); Achim Pantfoerder, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 11/650,117

(22) Filed: Jan. 5, 2007

(65) Prior Publication Data

US 2008/0006762 A1    Jan. 10, 2008

Related U.S. Application Data

(63) Continuation-in-part of application No. 11/600,344, filed on Nov. 15, 2006, and a continuation-in-part of application No. 11/241,839, filed on Sep. 30, 2005, and a continuation-in-part of application No. 11/240,788, filed on Sep. 30, 2005.

(51) Int. Cl.
  *G01J 1/44* (2006.01)
  *H05B 37/02* (2006.01)
  *H05B 39/04* (2006.01)

(52) U.S. Cl. ............... 250/214 AL; 250/214 B; 250/201.1

(58) Field of Classification Search ........... 250/214 AL, 250/214 B, 201.1; 340/556
See application file for complete search history.

(56) References Cited

U.S. PATENT DOCUMENTS

| | | | |
|---|---|---|---|
| 5,103,085 A * | 4/1992 | Zimmerman | 250/221 |
| 5,270,818 A | 12/1993 | Ottenstein | |
| 5,406,305 A | 4/1995 | Shimomura et al. | |
| 5,528,266 A | 6/1996 | Arbeitman et al. | |
| 5,684,294 A * | 11/1997 | Kouhi | 250/214 AL |
| 5,952,992 A | 9/1999 | Helms | |

(Continued)

FOREIGN PATENT DOCUMENTS

EP    0992969    4/2000

(Continued)

OTHER PUBLICATIONS

U.S. Appl. No. 11/165,958, filed on Jun. 23, 2005, by inventors Steve P. Hotelling and Scott A. Brenneman (pp. 1-23 and 5 sheets of drawings).

(Continued)

*Primary Examiner*—Seung C Sohn
(74) *Attorney, Agent, or Firm*—Blakely, Sokoloff, Taylor & Zafman LLP

(57) ABSTRACT

Apparatuses and methods to sense proximity and to detect light. In one embodiment, an apparatus includes an emitter of electromagnetic radiation and a detector of electromagnetic radiation; the detector has a sensor to detect electromagnetic radiation from the emitter when sensing proximity, and to detect electromagnetic radiation from a source other than the emitter when sensing visible light. The emitter may be disabled at least temporarily to allow the detector to detect electromagnetic radiation from a source other than the emitter, such as ambient light. In one implementation, the ambient light is measured by measuring infrared wavelengths. Also, a fence having a non-IR transmissive material disposed between the emitter and the detector to remove electromagnetic radiation emitted by the emitter. Other apparatuses and methods and data processing systems and machine readable media are also described.

62 Claims, 24 Drawing Sheets

U.S. PATENT DOCUMENTS

| | | | |
|---|---|---|---|
| 6,373,612 | B1 | 4/2002 | Hoffman et al. |
| 6,520,013 | B1 | 2/2003 | Wehrenberg |
| 6,583,676 | B2 | 6/2003 | Krah et al. |
| 6,601,012 | B1 | 7/2003 | Horvitz et al. |
| 6,664,744 | B2 | 12/2003 | Dietz |
| 6,812,466 | B2 * | 11/2004 | O'Connor et al. ........ 250/341.1 |
| 6,822,635 | B2 | 11/2004 | Shahoian et al. |
| 6,947,571 | B1 | 9/2005 | Rhoads et al. |
| 6,956,564 | B1 | 10/2005 | Williams |
| 7,016,705 | B2 | 3/2006 | Bahl et al. |
| 7,019,622 | B2 | 3/2006 | Orr et al. |
| 7,171,221 | B1 | 1/2007 | Amin et al. |
| 7,522,065 | B2 | 4/2009 | Falcon |
| 2001/0031633 | A1 | 10/2001 | Tuomela et al. |
| 2002/0167488 | A1 | 11/2002 | Hinckley et al. |
| 2003/0095096 | A1 | 5/2003 | Robbin et al. |
| 2004/0180649 | A1 | 9/2004 | Vogel et al. |
| 2004/0224638 | A1 | 11/2004 | Fadell et al. |
| 2004/0233153 | A1 | 11/2004 | Robinson |
| 2004/0245438 | A1 | 12/2004 | Payne et al. |
| 2005/0190142 | A1 | 9/2005 | Ferguson |
| 2005/0219223 | A1 | 10/2005 | Kotzin et al. |
| 2005/0219228 | A1 | 10/2005 | Alameh et al. |
| 2005/0219394 | A1 | 10/2005 | Du et al. |
| 2005/0221791 | A1 | 10/2005 | Angelhag |
| 2006/0017692 | A1 | 1/2006 | Wehrenberg et al. |
| 2006/0026521 | A1 | 2/2006 | Hotelling et al. |
| 2006/0026535 | A1 | 2/2006 | Hotelling et al. |
| 2006/0060762 | A1 | 3/2006 | Chan et al. |
| 2006/0097991 | A1 | 5/2006 | Hotelling et al. |
| 2006/0117108 | A1 | 6/2006 | Salisbury et al. |
| 2006/0146012 | A1 | 7/2006 | Arneson et al. |
| 2006/0161870 | A1 | 7/2006 | Hotelling et al. |
| 2006/0161871 | A1 | 7/2006 | Hotelling et al. |
| 2006/0164241 | A1 * | 7/2006 | Makela et al. ............... 340/556 |
| 2007/0075965 | A1 | 4/2007 | Huppi et al. |
| 2007/0085157 | A1 | 4/2007 | Fadell et al. |
| 2007/0099574 | A1 | 5/2007 | Wang |
| 2008/0006762 | A1 | 1/2008 | Fadell et al. |
| 2008/0090617 | A1 | 4/2008 | Sutardja |
| 2008/0113618 | A1 | 5/2008 | De Leon et al. |

FOREIGN PATENT DOCUMENTS

| | | |
|---|---|---|
| EP | 1185058 | 3/2002 |
| EP | 1335430 | 8/2003 |
| EP | 1355223 | 10/2003 |
| EP | 1452988 | 9/2004 |
| EP | 1507132 | 2/2005 |
| EP | 1507196 | 2/2005 |
| EP | 1650938 | 4/2006 |
| EP | 1696414 | 8/2006 |
| GB | 2346500 | 8/2000 |
| GB | 2418808 | 4/2006 |
| JP | 05-323277 | 12/1993 |
| JP | 2007-163872 | 6/2007 |
| WO | WO-2004/093045 | 10/2004 |
| WO | WO-2005/101176 | 10/2005 |

OTHER PUBLICATIONS

Agilent Technologies Inc., "Agilent unveils optical proximity sensor for mobile appliances", http:/www.embeddedstar.com/press/content/2004/8/embedded16015.html, (Aug. 31, 2004),2 pages.

Apple Inc., "PCT Notification of Transmittal of the International Search Report and the Written Opinion of the International Searching Authority", PCT/US2007/022335, (Feb. 18, 2008).

CNET NEWS.COM, "Reinventing the Scroll Wheel", Photo 1, http://news.com.2300-1041_3-6107951-1.html?tag=ne.gall.pg, (Aug. 22, 2006),2 pages.

CNET NEWS.COM, "Reinventing the Scroll Wheel", Photo 2, http://news.com/2300-1042_3-6107951-2.html?tag=ne.gall.pg, (Aug. 22, 2006),2 pages.

CNET NEWS.COM, "Reinventing the Scroll Wheel", Photo 3, http://news.com/2300-1041_3-6107951-3.html?tag=ne.gall.pg, (Aug. 22, 2006),2 pages.

CNET NEWS.COM, "Reinventing the Scroll Wheel", Photo 4, http://news.com/2300-1041_3-6107951-4.html?tag=ne.gall.pg, (Aug. 22, 2006),2 pages.

CNET NEWS.COM, "Reinventing the Scroll Wheel", Photo 5, http://news.com/2300-1041_3-6107951-5.html?tag=ne.gall.pg, (Aug. 22, 2006),2 pages.

CNET NEWS.COM, "Reinventing the Scroll Wheel", Photo 6, http://news.com/2300-1041_3-6107951-6.html?tag=ne.gall.pg, (Aug. 22, 2006),2 pages.

CNET NEWS.COM, "Reinventing the Scroll Wheel", Photo 7, http://news.com/2300-1041_3-6107951-7.html?tag=ne.gall.pg, (Aug. 22, 2006),2 pages.

CNET NEWS.COM, "Reinventing the Scroll Wheel", Photo 8, http://news.com/2300-1041_3-6107951-8.html?tag=ne.gall.pg, (Aug. 22, 2006),2 pages.

Kennedy, "Methods and Apparatuses for Configuration Automation", U.S. Appl. No. 10/805,144, 59 pages.

Roos, Gina "Agilent's new proximity sensor beats the fumble-fingered competition hands down . . . literally", eeProductCenter, URL:http://www.eeproductcenter.com/showArticle.jhtml?articleID_46200544, (Sep. 1, 2004),3 pages.

Universal Remote Control, Inc., "MX-950 (The Aurora)", www.unversalremote.com,(2005).

Universal Remote Control, Inc., "All Complete Control Remotes Now Use Narrow Band RF", http://www.universalremote.com/corporate/press_release.php?press=13, (2008).

Universal Remote Control, Inc., "Operating System with the Aurora MX-950", MX-950 Owners Manual, (2005).

Apple Inc., PCT Search Report and Written Opinion mailed Jun. 3, 2008, PCT Appln. No. PCT/US2007/026164.

PCT Search Report mailed Aug. 21, 2008; PCT/US2007/026130.

Apple Inc., "PCT Search Report and Written Opinion mailed Jul. 3, 2008", PCT/US2007/023124, 14 pages.

"Proximity Sensor Demo Kit User Guide, Version 0.62-Preliminary", *Integration Associates, Inc.*; 2004, 17 pages.

"Apple Inc.", *International Preliminary Report on Patentability mailed May 28, 2009*; PCT Applicaiotn No. PCT/US2007/023124.

"Apple Inc.", *International Preliminary Report on Patentability mailed May 7, 2009*; PCT Application No. PCT/US2007/022335.

"Apple Inc.", *International Preliminary Report on Patentability mailed Jul. 16, 2009*; PCT Application No. PCT/US2007/026164.

"Apple Inc.", *International Preliminary Report on Patentability mailed Jul. 16, 2009*; PCT Application No. PCT/US2007/026141.

Apple Inc., *International Preliminary Report on Patentability mailed Jul. 16, 2009*; PCT Application No. PCT/US2007/026130.

* cited by examiner

INTEGRATED PROXIMITY SENSOR AND LIGHT SENSOR

CROSS REFERENCE TO RELATED APPLICATIONS

This application is a Continuation-in-Part of U.S. patent application Ser. No. 11/241,839 filed on Sep. 30, 2005, titled "PROXIMITY DETECTOR IN HANDHELD DEVICE"; U.S. patent application Ser. No. 11/240,788 filed on Sep. 30, 2005, titled "PROXIMITY DETECTOR IN HANDHELD DEVICE"; and U.S. patent application Ser. No. 11/600,344, filed Nov. 15, 2006 titled "INTEGRATED PROXIMITY SENSOR AND LIGHT SENSOR" which are all incorporated herein by reference in their entireties.

FIELD OF THE INVENTION

This invention relates to the field of portable devices and, in particular, to systems and methods for sensing or determining user activities and responding to the user's activities.

BACKGROUND OF THE INVENTION

Portable devices, such as cell phones, are becoming increasingly common. These portable devices have grown more complex over time, incorporating many features including, for example, MP3 player capabilities, web browsing capabilities, capabilities of personal digital assistants (PDAs) and the like.

Some of these portable devices may include multiple sensors which are used to detect the environment or context associated with these portable devices. For example, U.S. patent application publication no. 2005/0219228 describes a device which includes many sensors, including a proximity sensor and a light sensor. The outputs from the sensors are processed to determine a device context. The light sensor detects ambient light levels and the proximity sensor detects a proximity to an object, such as a user's ear or face. In this case, there are two separate sensors which require two openings in the housing of the device. This is shown in FIG. 1, which shows a device 10. The device 10 includes a proximity sensor 12 mounted on a surface of the device 10 and an ambient light sensor 14 also mounted on the surface of the device 10. Each of these sensors is distinct from the other, and separate openings in the surface are needed for each sensor.

SUMMARY OF THE DESCRIPTION

The various apparatuses and methods described herein relate to an apparatus which senses proximity and detects light, such as ambient light, and to systems, such as data processing systems, which use an apparatus which senses proximity and also detects light, such as ambient light.

According to one embodiment of the inventions, an apparatus, which both senses proximity and detects light, includes an emitter of electromagnetic radiation and a detector of electromagnetic radiation. The detector is configured to detect electromagnetic radiation, such as infrared (IR) light, emitted from the emitter when the apparatus is configured to sense proximity. The emitter may be disabled at least temporarily to allow the detector to detect electromagnetic radiation from a source other than the emitter. In this case, the emitter may be disabled by turning power off for the emitter or by closing a shutter on the emitter to block radiation from being emitted to the environment or by other implementations which prevent the emitter's radiation from being detected by the detector. In an alternative implementation, rather than disabling the emitter, the output from the detector may be processed, using known signal processing algorithms, to subtract the effect of the radiation detected from the emitter in order to produce a resultant signal which represents the radiation from sources other than the emitter. This may involve measuring proximity first to determine an amplitude and phase of a known signal from the emitter (e.g. a square wave signal with a known frequency and pulse width) and then subtracting this known signal from a detected signal from the detector. Alternatively, if the emitter has sufficiently long "on" and "off" pulses during its square wave signal, the detector may be configured to measure ambient light during one or more of the "off" pulses without having to turn off the emitter.

According to another embodiment of the inventions, a data processing system includes a proximity sensor to sense a proximity and to detect electromagnetic radiation when the proximity sensor is not sensing proximity. The proximity sensor includes an emitter of electromagnetic radiation (e.g. IR light) and a detector of electromagnetic radiation from the emitter when the sensor is sensing proximity. The data processing system also may include at least one of a display or an input device and also may include at least one processor which is coupled to the proximity sensor and which is configured to determine, based at least upon data from the proximity sensor, whether to modify a state (e.g. a setting) of the data processing system. The data from the proximity sensor may include data relating to proximity and data relating to ambient light measurements or other light measurements. The processor may modify the state of the data processing system automatically in response to a user activity, relative to the system, as indicated by the data from the proximity sensor, including both proximity data and ambient light data.

According to another embodiment of the inventions, a method of operating a proximity sensor, which provides light sensor capabilities, includes emitting light from an emitter of the proximity sensor, detecting, through a detector of the proximity sensor, light from the emitter, and sensing light, from a source other than the emitter, at the detector. The detector is configured, in a proximity sensing mode, to detect light from the emitter to determine proximity. The detector may sense light from a source other than the emitter by having the emitter disabled or by having its output signal processed to remove the effect of light from the emitter.

Embodiments of the inventions may also provide apparatus, systems, methods of use, and software related to a combined proximity sensor and ambient light sensor (ALS). The combined sensor may include a proximity sensor portion that overlaps with an ALS sensor portion. The ALS portion of the combined sensor may include two sensors (e.g., phototransistors), one with a filter having a passband that only passes infrared (IR) (e.g., IR light), and one with a filter having a passband that passes both IR and visible light (VL). The output of the IR sensor may then be subtracted from the output of the IR and VL sensor to produce a passband that only passes VL. This subtracted value may be used to detect ambient light. The proximity sensor portion of the combined sensor may be comprised of an IR emitting diode and a phototransistor having a filter having a passband that only passes IR. According to some embodiments, the phototransistor and filter for the proximity sensor portion are the same phototransistor and filter (having a passband that only passes IR) that is used by the ALS portion of the sensor.

Embodiments of the inventions may also include an anti-reflective fence for the ambient light sensor portion and/or the proximity sensor portion. For example, a "fence" having a non-IR transmissive surface or material may be disposed between the IR emitter and one or both of the phototransistors. The fence may extend to an anti-glare covering or hardcoat above the emitter (e.g., a covering on the very outside of the sensor or device the sensor is a part of) having refractive properties that cause IR from the emitter to reflect back into one or both of the phototransistors causing erroneous readings for the proximity sensor and/or ALS.

Other apparatuses, data processing systems, methods and machine readable media are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
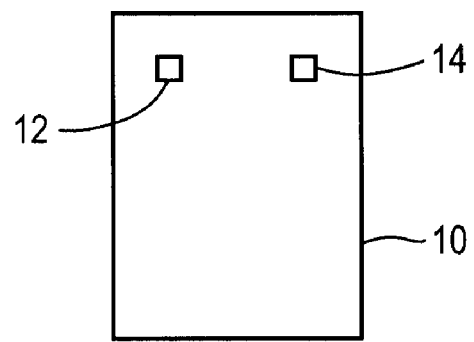
FIG. 1 shows an example of a prior art device which includes two separate sensors.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the present inventions include one or more sensors to monitor user activity. At least certain embodiments of the present inventions also include automatically changing a state of the portable device based on user activity, such as, for example, automatically activating or deactivating a backlight of a display device of the portable device or setting an input device of the portable device to a particular state, based on certain predetermined user activities.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 2:
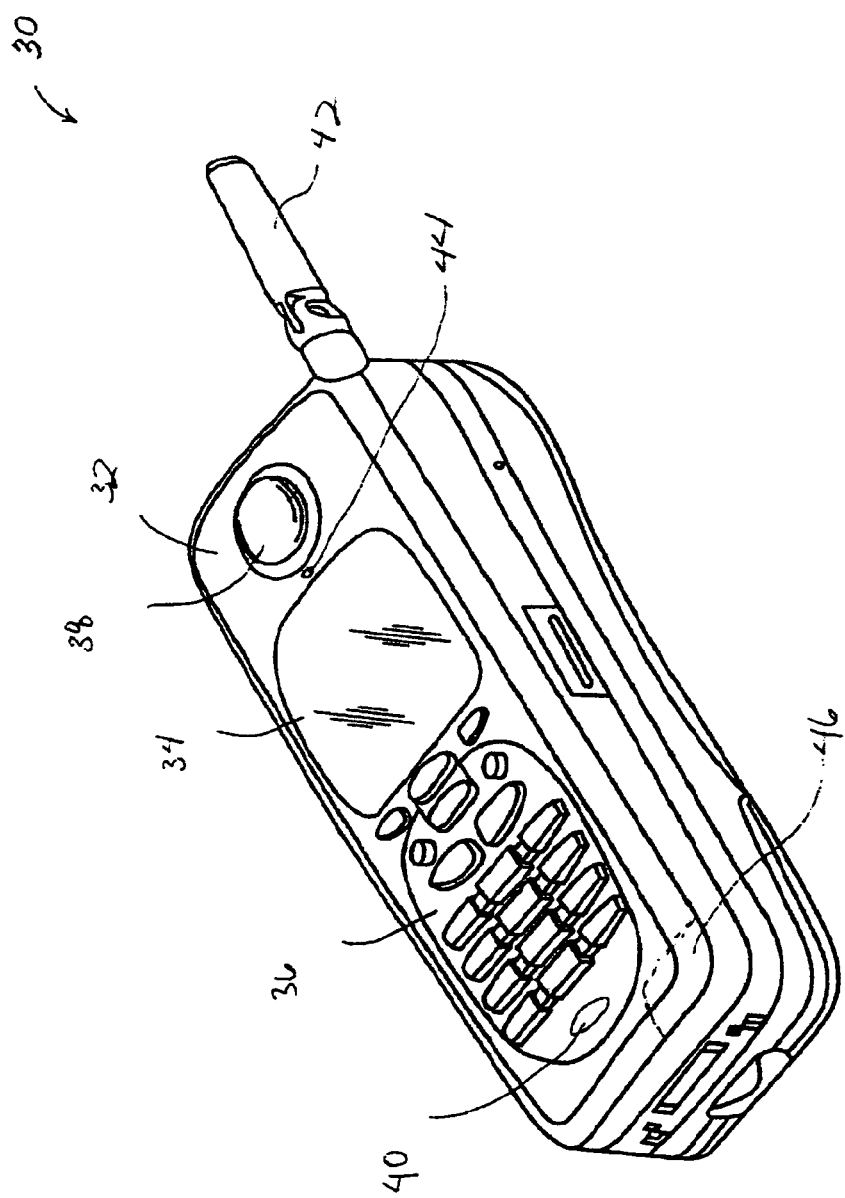
FIG. 2 is a perspective view of a portable device in accordance with one embodiment of the present invention.

FIG. 2 illustrates a portable device 30 according to one embodiment of the invention. FIG. 2 shows a wireless device in a telephone configuration having a "candy-bar" style. In FIG. 2, the wireless device 30 may include a housing 32, a display device 34, an input device 36 which may be an alphanumeric keypad, a speaker 38, a microphone 40 and an antenna 42. The wireless device 30 also may include a proximity sensor 44 and an accelerometer 46. It will be appreciated that the embodiment of FIG. 2 may use more or fewer sensors and may have a different form factor from the form factor shown in FIG. 2.

The display device 34 is shown positioned at an upper portion of the housing 32, and the input device 36 is shown positioned at a lower portion of the housing 32. The antenna 42 is shown extending from the housing 32 at an upper portion of the housing 32. The speaker 38 is also shown at an upper portion of the housing 32 above the display device 34. The microphone 40 is shown at a lower portion of the housing 32, below the input device 36. It will be appreciated that the speaker 38 and microphone 40 can be positioned at any location on the housing, but are typically positioned in accordance with a user's ear and mouth, respectively. The proximity sensor 44 is shown at or near the speaker 38 and at least partially within the housing 32. The accelerometer 46 is shown at a lower portion of the housing 32 and within the housing 32. It will be appreciated that the particular locations of the above-described features may vary in alternative embodiments.

The display device 34 may be, for example, a liquid crystal display (LCD) which does not include the ability to accept inputs or a touch input screen which also includes an LCD. The input device 36 may include, for example, buttons, switches, dials, sliders, keys or keypad, navigation pad, touch pad, touch screen, and the like.

Any well-known speaker, microphone and antenna can be used for speaker 38, microphone 40 and antenna 42, respectively.

Figure 7A:
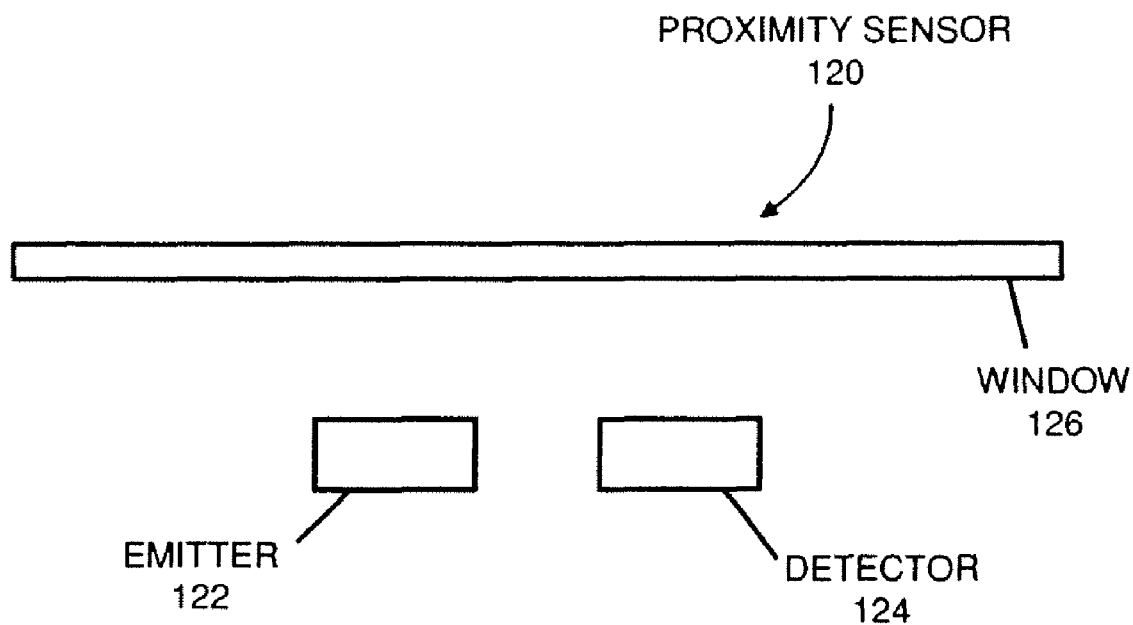
FIG. 7A is a schematic side view of a proximity sensor in accordance with one embodiment of the present invention.

The proximity sensor 44 may detect location (e.g. at least one of X, Y, Z), direction of motion, speed, etc. of objects relative to the wireless device 30. A location of an object relative to the wireless device can be represented as a distance in at least certain embodiments. The proximity sensor may generate location or movement data or both, which may be used to determine the location of objects relative to the portable device 30 and/or proximity sensor 44. An example of a proximity sensor is shown in FIG. 7A.

In addition, a processing device (not shown) is coupled to the proximity sensor(s) 44. The processing device may be used to determine the location of objects relative to the portable device 30 or proximity sensor 44 or both based on the location and/or movement data provided by the proximity sensor 44. The proximity sensor may continuously or periodically monitor the object location. The proximity sensor may also be able to determine the type of object it is detecting.

Additional information about proximity sensors can be found in U.S. patent application Ser. No. 11/241,839, titled "PROXIMITY DETECTOR IN HANDHELD DEVICE," and U.S. patent application Ser. No. 11/240,788, titled "PROXIMITY DETECTOR IN HANDHELD DEVICE;" U.S. patent application Ser. No. 11/165,958, titled "METHODS AND APPARATUS FOR REMOTELY DETECTING PRESENCE," filed Jun. 23, 2005; and U.S. Pat. No. 6,583, 676, titled "PROXIMITY/TOUCH DETECTOR AND CALIBRATION CIRCUIT," issued Jun. 24, 2003, all of which are incorporated herein by reference in their entirety.

According to one embodiment, the accelerometer 46 is able to detect a movement including an acceleration or de-acceleration of the wireless device. The accelerometer 46 may generate movement data for multiple dimensions, which may be used to determine a direction of movement of the wireless device. For example, the accelerometer 46 may generate X, Y and Z axis acceleration information when the accelerometer 46 detects that the portable device is moved. In one embodiment, the accelerometer 46 may be implemented as described in U.S. Pat. No. 6,520,013, which is incorporated herein by reference in its entirety. Alternatively, the accelerometer 46 may be a KGF01 accelerometer from Kionix or an ADXL311 accelerometer from Analog Devices or other accelerometers which are known in the art.

In addition, a processing device (not shown) is coupled to the accelerometer(s) 46. The processing device may be used to calculate a direction of movement, also referred to as a movement vector of the wireless device 30. The movement vector may be determined according to one or more predetermined formulas based on the movement data (e.g., movement in X, Y and Z) provided by accelerometer 46. The processing device may be integrated with the accelerometer 46 or integrated with other components, such as, for example, a chipset of a microprocessor, of the portable device.

The accelerometer 46 may continuously or periodically monitor the movement of the portable device. As a result, an orientation of the portable device prior to the movement and after the movement may be determined based on the movement data provided by the accelerometer attached to the portable device.

Additional information about accelerometers can be found in co-pending U.S. patent application Ser. No. 10/986,730, filed Nov. 12, 2004, which is hereby incorporated herein by reference in its entirety.

The data acquired from the proximity sensor 44 and the accelerometer 46 can be combined together, or used alone, to gather information about the user's activities. The data from the proximity sensor 44, the accelerometer 46 or both can be used, for example, to activate/deactivate a display backlight, initiate commands, make selections, control scrolling or other movement in a display, control input device settings, or to make other changes to one or more settings of the device.

Figure 3:
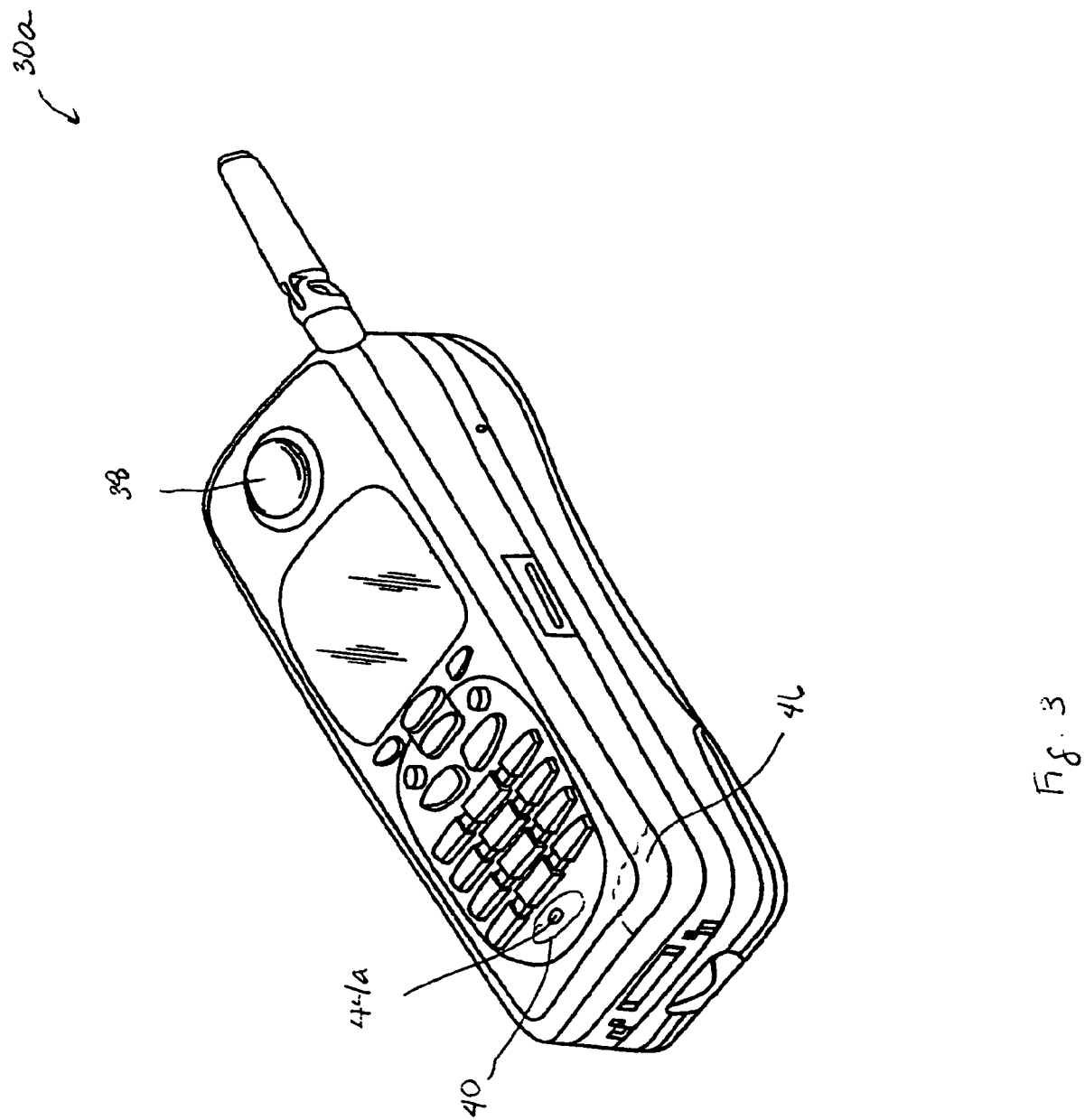
FIG. 3 is a perspective view of a portable device in accordance with one embodiment of the present invention.

FIG. 3 shows an alternative portable device 30a, which is similar to the portable device 30 illustrated in FIG. 2. The portable device 30a shown in FIG. 3 can differ from the portable device 30 shown in FIG. 2 in that the proximity sensor 44a (FIG. 3) is located at or near the microphone 40.

Figure 4:
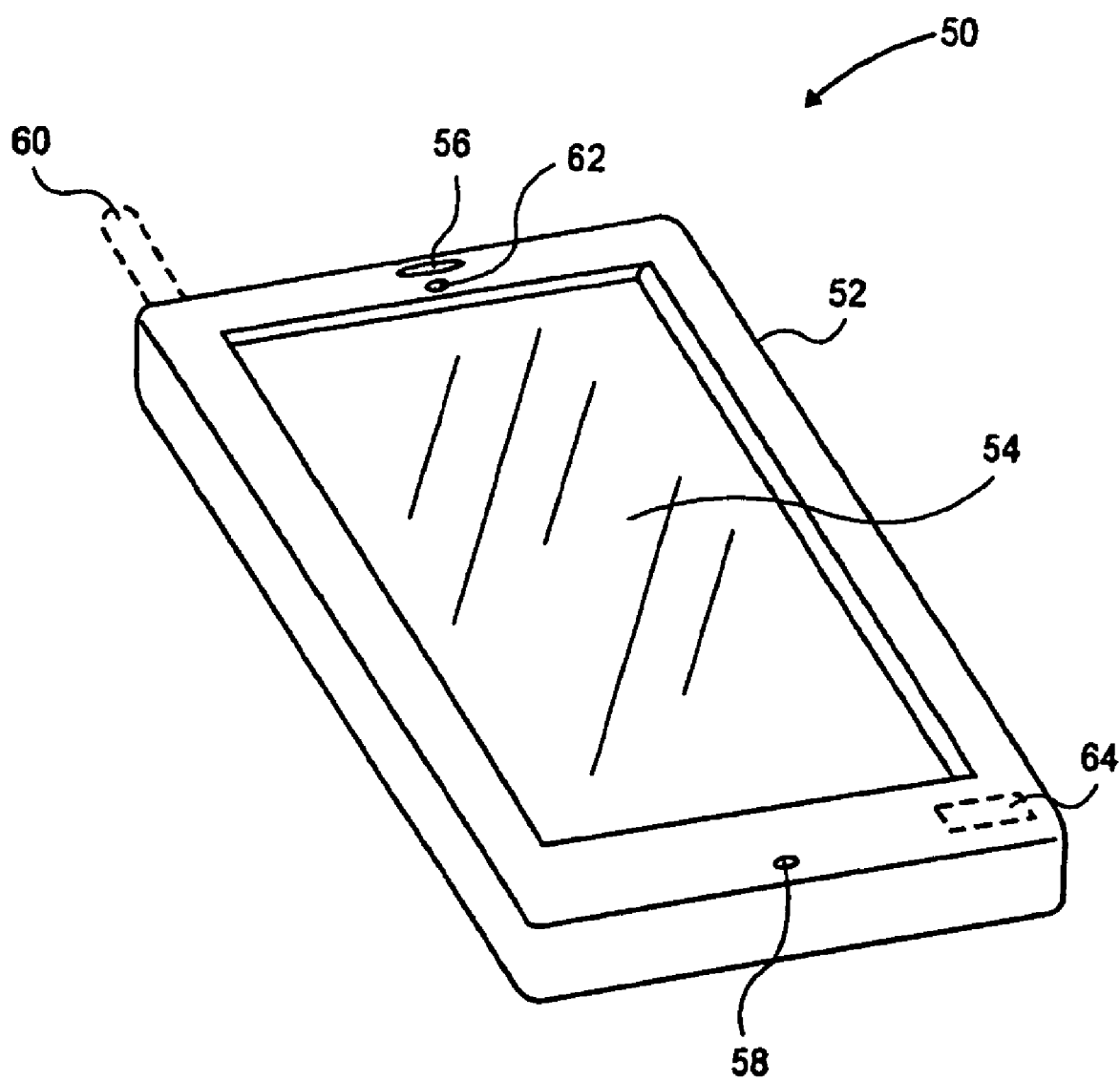
FIG. 4 is a perspective view of a portable device in accordance with one embodiment of the present invention.

FIG. 4 shows a portable device 50 in accordance with one embodiment of the invention. The portable device 50 may include a housing 52, a display/input device 54, a speaker 56, a microphone 58 and an optional antenna 60 (which may be visible on the exterior of the housing or may be concealed within the housing). The portable device 50 also may include a proximity sensor 62 and an accelerometer 64. The portable device 50 may be a cellular telephone or a device which is an integrated PDA and a cellular telephone or a device which is an integrated media player and a cellular telephone or a device which is both an entertainment system (e.g. for playing games) and a cellular telephone, or the portable device 50 may be other types of devices described herein. In one particular embodiment, the portable device 50 may include a cellular telephone and a media player and a PDA, all contained within the housing 52. The portable device 50 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 54 may include a multi-point touch input screen in addition to being a display, such as an LCD. In one embodiment, the multi-point touch screen is a capacitive sensing medium configured to detect multiple touches (e.g., blobs on the display from a user's face or multiple fingers concurrently touching or nearly touching the display) or near touches (e.g., blobs on the display) that occur at the same time and at distinct locations in the plane of the touch panel and to produce distinct signals representative of the location of the touches on the plane of the touch panel for each of the multiple touches. Additional information about multi-point input touch screens can be found in co-pending U.S. patent application Ser. No. 10/840,862, filed May 6, 2004 (see published U.S. patent application 20060097991), which is incorporated herein by reference in its entirety. A multi-point input touch screen may also be referred to as a multi-touch input panel.

A processing device (not shown) may be coupled to the display/input device 54. The processing device may be used to calculate touches on the touch panel. The display/input device 54 can use the detected touch (e.g., blob or blobs from a user's face) data to, for example, identify the location of certain objects and to also identify the type of object touching (or nearly touching) the display/input device 54.

The data acquired from the proximity sensor 62 and the display/input device 54 can be combined to gather information about the user's activities as described herein. The data from the proximity sensor 62 and the display/input device 54 can be used to change one or more settings of the portable device 50, such as, for example, change an illumination setting of the display/input device 54.

In one embodiment, as shown in FIG. 4, the display/input device 54 occupies a large portion of one surface (e.g. the top surface) of the housing 52 of the portable device 50. In one embodiment, the display/input device 54 consumes substantially the entire front surface of the portable device 50. In another embodiment, the display/input device 54 consumes, for example, at least 75% of a front surface of the housing 52 of the portable device 50. In alternative embodiments, the portable device 50 may include a display which does not have input capabilities, but the display still occupies a large portion of one surface of the portable device 50. In this case, the portable device 50 may include other types of input devices such as a QWERTY keyboard or other types of keyboard which slide out or swing out from a portion of the portable device 50.

Figure 5A:
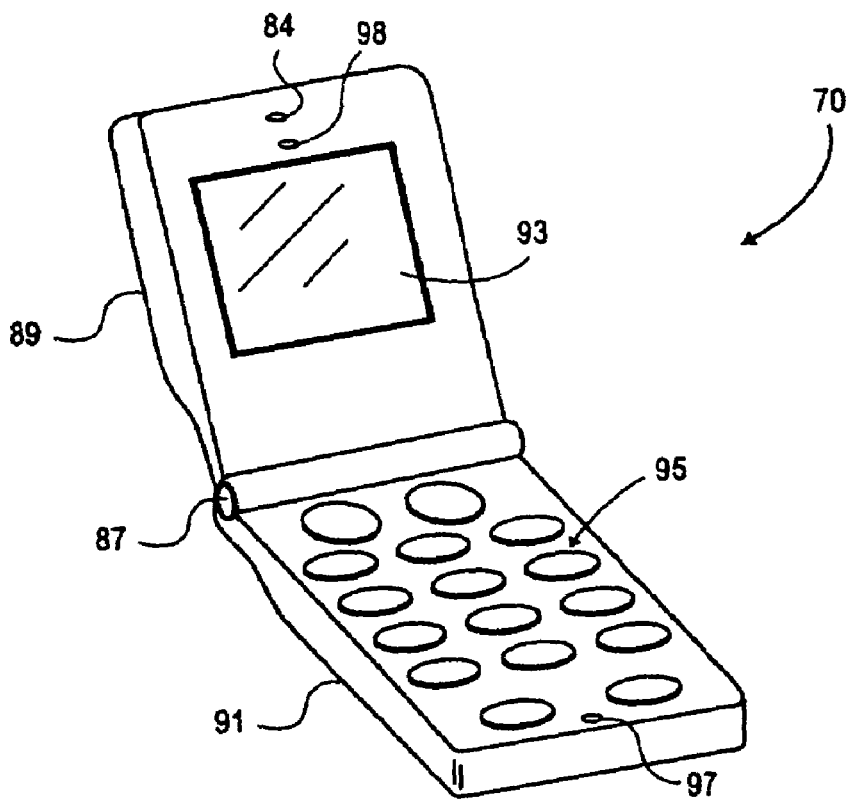
FIG. 5A is a perspective view of a portable device in a first configuration (e.g. in an open configuration) in accordance with one embodiment of the present invention.
Figure 5B:
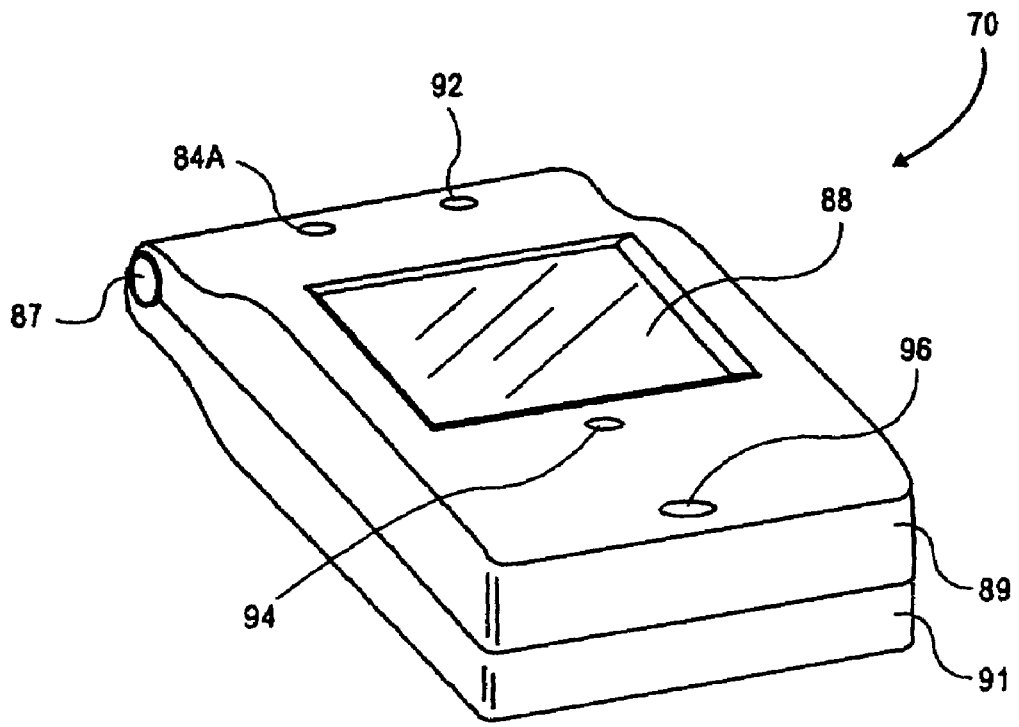
FIG. 5B is a perspective view of the portable device of FIG. 5A in a second configuration (e.g. a closed configuration) in accordance with one embodiment of the present invention.

FIGS. 5A and 5B illustrate a portable device 70 according to one embodiment of the invention. The portable device 70 may be a cellular telephone which includes a hinge 87 that couples a display housing 89 to a keypad housing 91. The hinge 87 allows a user to open and close the cellular telephone so that it can be placed in at least one of two different configurations shown in FIGS. 5A and 5B. In one particular embodiment, the hinge 87 may rotatably couple the display housing to the keypad housing. In particular, a user can open the cellular telephone to place it in the open configuration shown in FIG. 5A and can close the cellular telephone to place it in the closed configuration shown in FIG. 5B. The keypad housing 91 may include a keypad 95 which receives inputs (e.g. telephone number inputs or other alphanumeric inputs) from a user and a microphone 97 which receives voice input from the user. The display housing 89 may include, on its interior surface, a display 93 (e.g. an LCD) and a speaker 98 and a proximity sensor 84; on its exterior surface, the display housing 89 may include a speaker 96, a temperature sensor 94, a display 88 (e.g. another LCD), an ambient light sensor 92, and a proximity sensor 84A. Hence, in this embodiment, the display housing 89 may include a first proximity sensor on its interior surface and a second proximity sensor on its exterior surface. The first proximity sensor may be used to detect a user's head or ear being within a certain distance of the first proximity sensor and to cause an illumination setting of displays 93 and 88 to be changed automatically in response to this detecting (e.g. the illumination for both displays are turned off or otherwise set in a reduced power state). Data from the second proximity sensor, along with data from the ambient light sensor 92 and data from the temperature sensor 94, may be used to detect that the cellular telephone has been placed into the user's pocket.

In at least certain embodiments, the portable device 70 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

Figure 6:
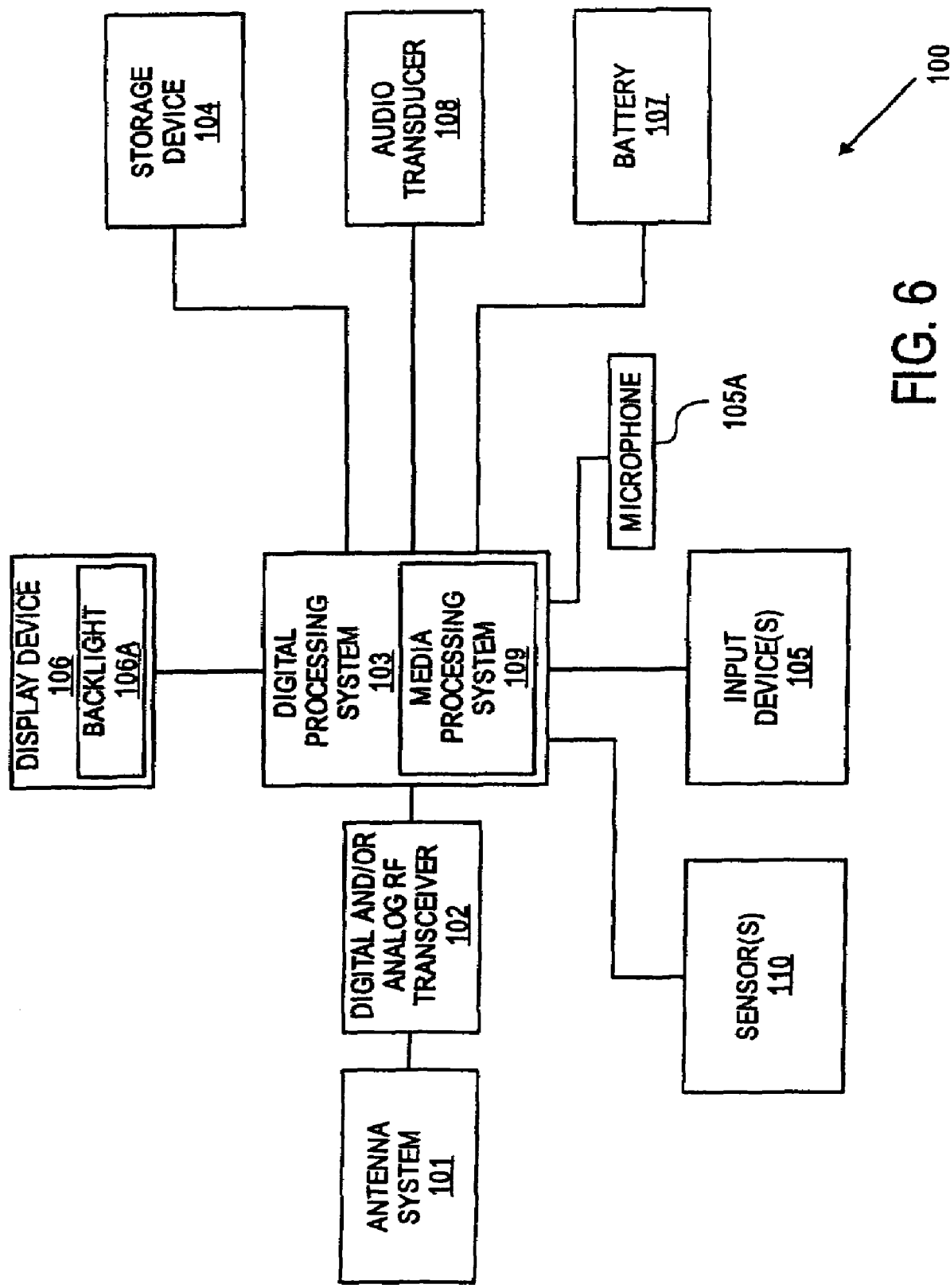
FIG. 6 is a block diagram of a system in which embodiments of the present invention can be implemented.

Each of the devices shown in FIGS. 2, 3, 4, 5A and 5B may be a wireless communication device, such as a cellular telephone, and may include a plurality of components which provide a capability for wireless communication. FIG. 6 shows an embodiment of a wireless device 100 which includes the capability for wireless communication. The wireless device 100 may be included in any one of the devices shown in FIGS. 2, 3, 4, 5A and 5B, although alternative embodiments of those devices of FIGS. 2-5B may include more or fewer components than the wireless device 100.

Wireless device 100 may include an antenna system 101. Wireless device 100 may also include a digital and/or analog radio frequency (RF) transceiver 102, coupled to the antenna system 101, to transmit and/or receive voice, digital data and/or media signals through antenna system 101.

Wireless device 100 may also include a digital processing system 103 to control the digital RF transceiver and to manage the voice, digital data and/or media signals. Digital processing system 103 may be a general purpose processing device, such as a microprocessor or controller for example. Digital processing system 103 may also be a special purpose processing device, such as an ASIC (application specific integrated circuit), FPGA (field-programmable gate array) or DSP (digital signal processor). Digital processing system 103 may also include other devices, as are known in the art, to interface with other components of wireless device 100. For example, digital processing system 103 may include analog-to-digital and digital-to-analog converters to interface with other components of wireless device 100. Digital processing system 103 may include a media processing system 109, which may also include a general purpose or special purpose processing device to manage media, such as files of audio data.

Wireless device 100 may also include a storage device 104, coupled to the digital processing system, to store data and/or operating programs for the wireless device 100. Storage device 104 may be, for example, any type of solid-state or magnetic memory device.

Wireless device 100 may also include one or more input devices 105, coupled to the digital processing system 103, to accept user inputs (e.g., telephone numbers, names, addresses, media selections, etc.) Input device 105 may be, for example, one or more of a keypad, a touchpad, a touch screen, a pointing device in combination with a display device or similar input device.

Wireless device 100 may also include at least one display device 106, coupled to the digital processing system 103, to display information such as messages, telephone call information, contact information, pictures, movies and/or titles or other indicators of media being selected via the input device 105. Display device 106 may be, for example, an LCD display device. In one embodiment, display device 106 and input device 105 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 106 may include a backlight 106a to illuminate the display device 106 under certain circumstances. It will be appreciated that the wireless device 100 may include multiple displays.

Wireless device 100 may also include a battery 107 to supply operating power to components of the system including digital RF transceiver 102, digital processing system 103, storage device 104, input device 105, microphone 105A, audio transducer 108, media processing system 109, sensor (s) 110, and display device 106. Battery 107 may be, for example, a rechargeable or non-rechargeable lithium or nickel metal hydride battery.

Wireless device 100 may also include audio transducers 108, which may include one or more speakers, and at least one microphone 105A.

Wireless device 100 may also include one or more sensors 110 coupled to the digital processing system 103. The sensor (s) 110 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the sensor(s) 110, various responses may be performed automatically by the digital processing system, such as, for example, activating or deactivating the backlight 106a, changing a setting of the input device 105 (e.g. switching between processing or not processing, as an intentional user input, any input data from an input device), and other responses and combinations thereof.

In one embodiment, digital RF transceiver 102, digital processing system 103 and/or storage device 104 may include one or more integrated circuits disposed on a printed circuit board (PCB).

Figure 7B:
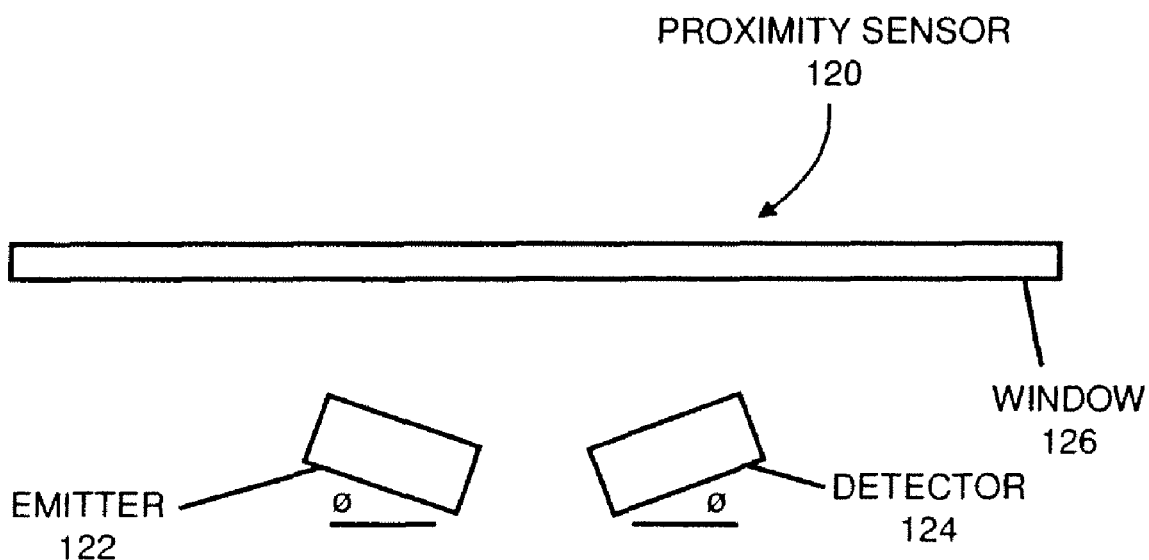
FIG. 7B is a schematic side view of an alternative proximity sensor in accordance with one embodiment of the present invention.

FIGS. 7A and 7B illustrate exemplary proximity sensors in accordance with embodiments of the invention. It will be appreciated that, in alternative embodiments, other types of proximity sensors, such as capacitive sensors or sonar-like sensors, may be used rather than the proximity sensors shown in FIGS. 7A and 7B. In FIG. 7A, the proximity sensor 120 includes an emitter 122, a detector 124, and a window 126. The emitter 122 generates light in the infrared (IR) bands, and may be, for example, a Light Emitting Diode (LED). The detector 124 is configured to detect changes in light intensity and may be, for example, a phototransistor. The window 126 may be formed from translucent or semi-translucent material. In one embodiment, the window 126 is an acoustic mesh, such as, for example, a mesh typically found with a microphone or speaker of the portable device. In other embodiments, the window 126 may be MicroPerf, IR transparent strands wound in a mesh, or a cold mirror.

During operation, the light from the emitter 122 hits an object and scatters when the object is present above the window 126. The light from the emitter may be emitted in square wave pulses which have a known frequency, thereby allowing the detector 124 to distinguish between ambient light and light from emitter 122 which is reflected by an object, such as the user's head or ear or a material in a user's pocket, back to the detector 124. At least a portion of the scattered light is reflected towards the detector 124. The increase in light intensity is detected by the detector 124, and this is interpreted by a processing system (not shown in FIG. 7A) to mean an object is present within a short distance of the detector 124. If no object is present or the object is beyond a certain distance from the detector 124, an insufficient or smaller amount of the emitted light is reflected back towards the detector 124, and this is interpreted by the processing system (not shown in FIG. 7A) to mean that an object is not present or is at a relatively large distance. In each case, the proximity sensor is measuring the intensity of reflected light which is related to the distance between the object which reflects the light and detector 124.

In one embodiment, the emitter 122 and detector 124 are disposed within the housing of a portable device, as described above with reference to FIGS. 2-5B.

In FIG. 7B, the emitter 122 and detector 124 of the proximity sensor are angled inward towards one another to improve detection of the reflected light, but the proximity sensor of FIG. 7B otherwise operates in a manner similar to the proximity sensor of FIG. 7A.

A proximity sensor in one embodiment of the inventions includes the ability to both sense proximity and detect electromagnetic radiation, such as light, from a source other than the emitter of the proximity sensor. One implementation of this embodiment may use an emitter of IR light and a detector of IR light to both sense proximity (when detecting IR light from the emitter) and to detect IR light from sources other than the emitter. The use of IR light for both the emitter and the detector of the proximity sensor may be advantageous because IR light is substantially present in most sources of ambient light (such as sunshine, incandescent lamps, LED light sources, candles, and to some extent, even fluorescent lamps). Thus, the detector can detect ambient IR light, which will generally represent, in most environments, ambient light levels at wavelengths other than IR, and use the ambient IR light level to effectively and reasonably accurately represent ambient light levels at wavelengths other than IR.

Figure 7C:
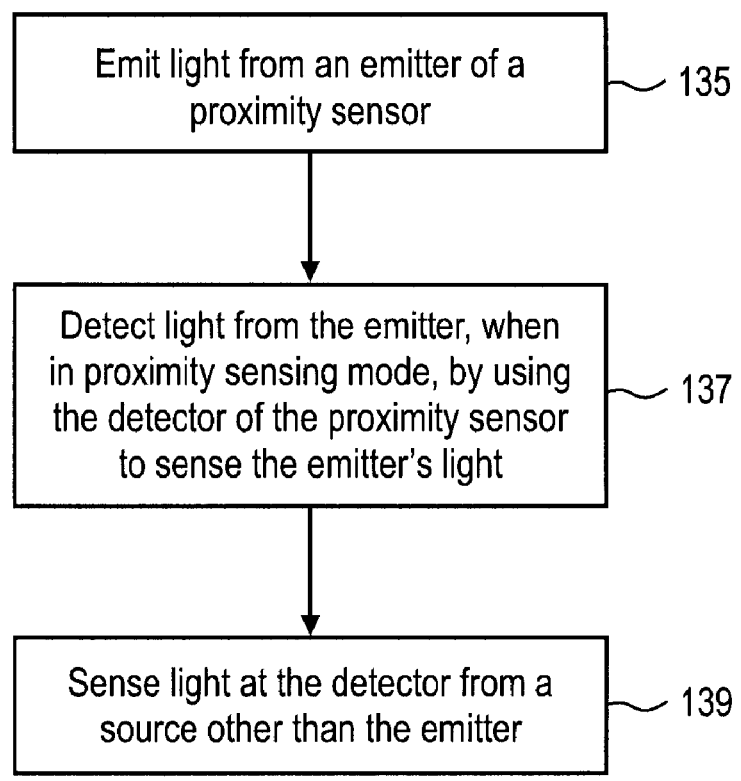
FIG. 7C is a flow chart which shows a method of operating a proximity sensor which is capable of detecting light from a source other than the emitter of the proximity sensor.
Figure 7D:
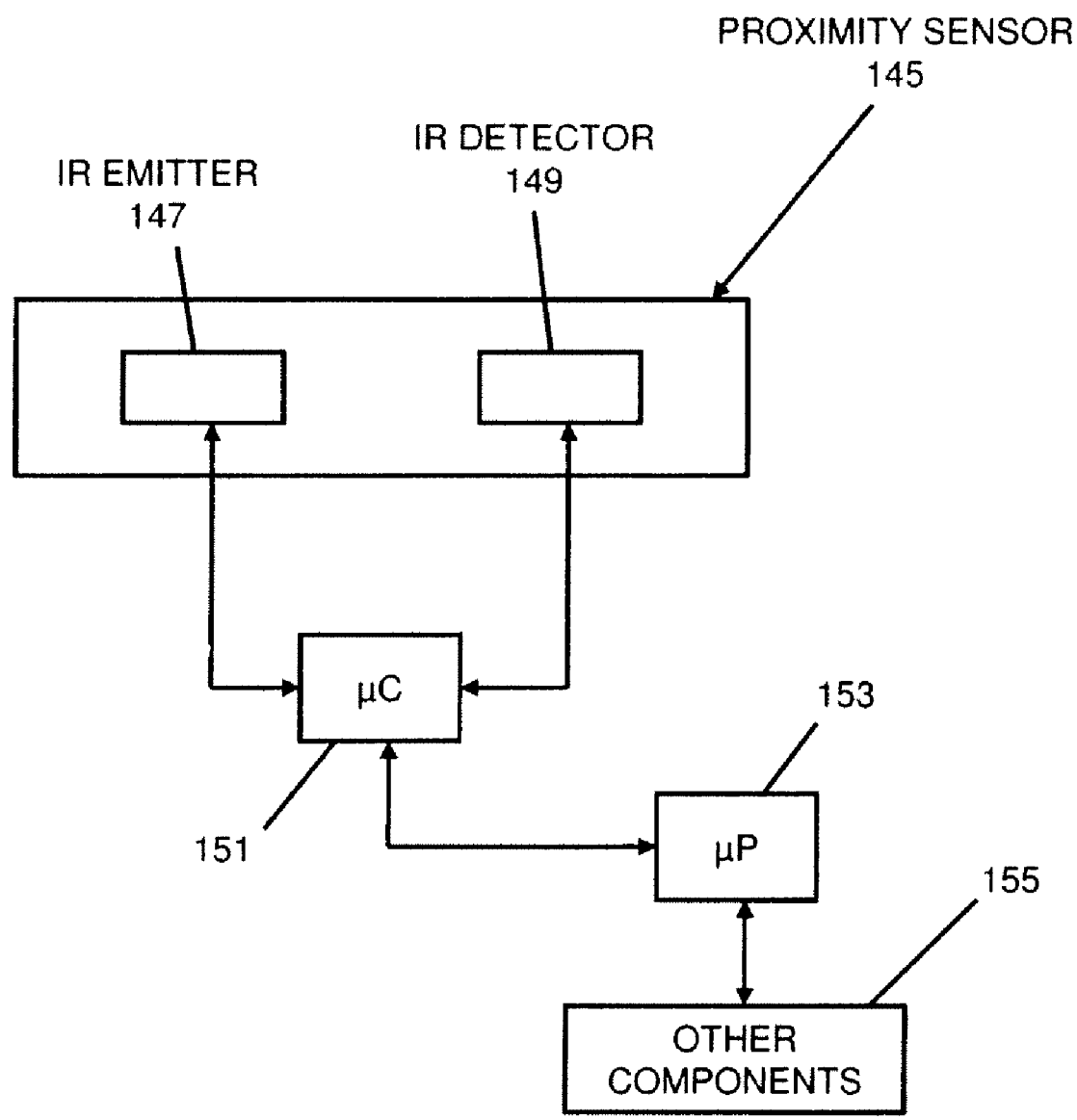
FIG. 7D shows an example of a proximity sensor with associated logic.

A method of operating a proximity sensor which includes the ability to both sense proximity and detect light is shown in FIG. 7C and an example, in block diagram form, of such a proximity sensor is shown in FIG. 7D. The method of FIG. 7C may use the proximity sensor shown in FIG. 7D or other proximity sensors. The method includes operation 135 in which electromagnetic radiation (e.g. IR light) is emitted from the emitter of the proximity sensor. The emitter may emit the radiation in a known, predetermined pattern (e.g. a train of square wave pulses of known, predetermined pulse width and frequency) which allows a detector to distinguish between ambient radiation and radiation from the emitter. In operation 137, the detector of the proximity sensor detects and measures light from the emitter when the detector is operating in proximity sensing mode. A processor coupled to the detector may process the signal from the detector to identify the known predetermined pattern of radiation from the emitter and to measure the amount of radiation from the emitter. In operation 139, the detector is used in a mode to sense radiation (e.g. ambient IR light) from a source other than the emitter; this operation may be implemented in a variety of ways. For example, the emitted light from the emitter may be disabled by a shutter (either a mechanical or electrical shutter) placed over the emitter or the emitter's power source may be turned off (thereby stopping the emission of radiation from the emitter). Alternatively, known signal processing techniques may be used to remove the effect of the emitter's emitted light which is received at the detector in order to extract out the light from sources other than the emitter. These signal processing techniques may be employed in cases where it is not desirable to turn on and off the emitter and where it is not desirable to use a shutter. It will be appreciated that operations 135, 137 and 139 may be performed in a sequence which is different than the sequence shown in FIG. 7C; for example, operation 139 may occur before operations 135 and 137.

FIG. 7D shows an embodiment of a range sensing IR proximity sensor 145 which includes the ability to sense and measure proximity and to detect and measure ambient light levels. The proximity sensor 145 includes an IR emitter 147 (e.g. an IR LED) and an IR detector 149. An optional shutter (e.g. an LCD electronic shutter) may be disposed over the emitter 147. The IR emitter 147 and the IR detector 149 may be coupled to a microcontroller 151 which may control switching between proximity sensing mode and ambient light sensing mode by either closing and opening an optional shutter or by turning on and off the power to the IR emitter 147. The output from the IR detector 149 may be provided from the microcontroller 151 to the microprocessor 153 which determines, from data from the proximity sensor 145, at least one proximity value and determines at least one ambient light level value. In an alternative embodiment, the microprocessor may be coupled to the IR emitter 147 and to the IR detector 149 without an intervening microcontroller, and the microprocessor may perform the functions of the microcontroller (e.g. the microprocessor may control switching between proximity sensing mode and ambient light sensing mode). The microprocessor 153 may be coupled to other components 155, such as input (e.g. keypad) or output (e.g. display) devices or memory devices or other sensors or a wireless transceiver system, etc. For example, the microprocessor 153 may be the main processor of the wireless device 100 shown in FIG. 6. In those embodiments in which a shutter over the IR emitter is not used and IR emissions from the IR emitter 147 are received at the IR detector 149 while the IR detector 149 is measuring ambient light levels, the microprocessor 153 (or the microcontroller 151) may filter out the known predetermined pattern of IR light from the IR emitter 147 in order to extract a signal from the IR detector 149 representing the IR light level from sources other than the IR emitter 147.

Figure 13:
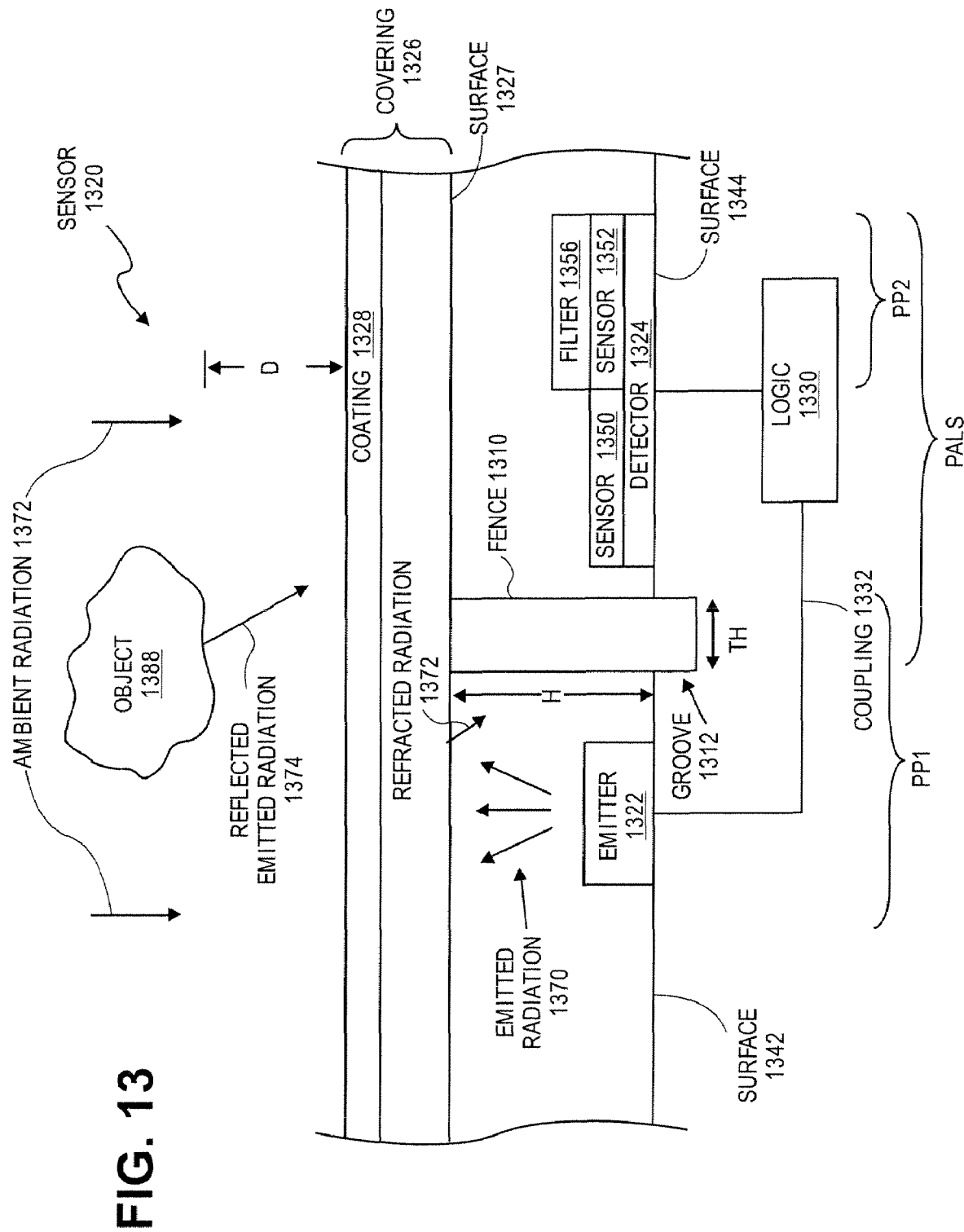
FIG. 13 is a schematic side view of a combined proximity sensor and ambient light sensor in accordance with one embodiment of the invention.

FIG. 13 is a schematic side view of a combined proximity sensor and ambient light sensor in accordance with one embodiment of the invention. FIG. 13 shows combined sensor 1320 including emitter 1322, detector 1324 and covering 1326, such as to detect the proximity of an object to the sensor and an ambient light level or intensity at the sensor. FIG. 13 also shows logic 1330, such as a processor and/or processing logic for controlling, receiving, scaling, subtracting, and/or determining outputs of components of sensor 1320 (e.g., emitter 1322, detector 1324, logic 1330 and components thereof) to determine proximity and/or ambient light. FIG. 13 also shows fence 1310, such as a fence that is antireflective or non-transmissive for radiation of emitter 1322. Fence 1310 may be disposed between the emitter and the detector, extending all the way up to covering 1326, to minimize erroneous readings caused by the detector receiving emitted radiation (e.g., radiation 1370) refracted by the cover (e.g., radiation 1372). According to some embodiments, fence 1310 may be excluded or not present in sensor 1320 (e.g., optional). Covering 1326 may or may not be a covering similar to covering 126, emitter 1322 may or may not be an emitter similar to emitter 122 as described above for FIGS. 7A through 7D.

Figure 15A:
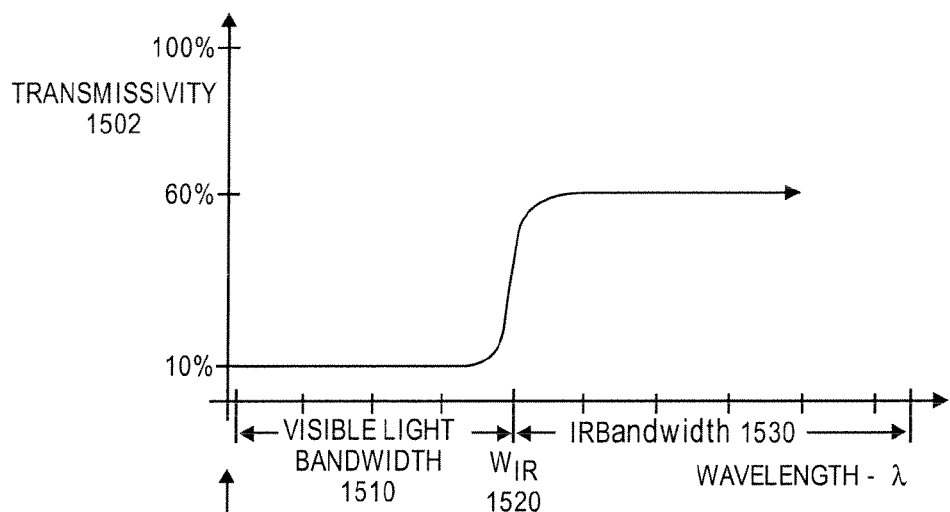
FIG. 15A is a graph showing transmissivity verse wavelength for a cover in accordance with one embodiment of the present invention.

Covering 1326 may have the same or different transmissivity properties for different wavelengths, wavelength bands (e.g., visible light and IR light), signal wavelength peaks, frequencies, frequency bands and/or signal frequency peaks of electromagnetic radiation. In some cases, covering 1326 may be described as a filter having a passband transmissivity for visible light and infrared light, such as to pass visible and IR light from incandescent bulbs and fluorescent bulb, as well as radiation 1370 and 1374. Covering 1326 may be described as passing emitted radiation 1370 or reflected radiation 1374 with a transmissivity similar or equal to that for which it passes ambient IR. According to embodiments, covering 1326 may pass only visible and IR light (e.g., only radiation in the visible light and IR band). Moreover, the transmissivity of covering 1326 may be a result of, caused by, or based on radiation passing through a coating of the covering, such as coating 1328. Coating 1328 may be a film, "hardcoat", ink, spray of dark or black color, and the like on the inside and/or outside surface of covering 1326. FIG. 15A shows an example transmissivity for covering 1326.

Emitter 1322 is showing emitting emitted radiation 1370 which may be refracted as refracted radiation 1372 by covering 1326. Refracted radiation 1372 may be a portion of the intensity of radiation 1370 refracted back towards detector 1324 (and/or emitter 1322) by covering 1326, such as by inner surface 1327 and/or coating 1328. Emitter 1322 may be an infrared (IR) light emitter or transmitter, and may emit IR light modulated at a modulation frequency. Thus, radiation 1370 may be an emission of the IR light modulated with a modulation frequency to form a modulated frequency signal (e.g., a combined or modulated signal that has a modulated frequency that is the emitter IR light modulated with the modulation signal). The modulated frequency signal may have a signal frequency peak (such as in the frequency domain, according to a Fourier Transform) at the frequency of the IR light of radiation 1370 (e.g., light emitted by a diode or LED in an having an IR peak and/or in an IR bandwidth) as well as at the modulation frequency.

Also, radiation 1370 may be reflected by object 1388 such as shown by reflected emitter radiation 1374, which may be received by detector 1324. That is, detector 1324 may receive radiation 1374 incident upon the outer surface of covering 1326 and passing through (or filtered by) covering 1326 and incident upon detector 1324. Object 1388 may be an object located distal to or outside of the outer surface of covering 1326, such as an object having a light and/or an IR light reflective surface, like an ear, a finger, a mouth, a material on the inside of a pant or shirt pocket, hair, surface of a person's face, and the like.

Object 1388 is shown having proximity D to combined sensor 1320. Proximity may be described as the straight line distance between an object and combined sensor 1320. For instance, FIG. 13 shows object 1388 distance D from the outer surface of covering 1326 of combined sensor 1320. It can be appreciated that determining distance D (e.g., the "proximity" of object 1388 to combined sensor 1320) may be performed by determining (e.g., using processing logic and sensor outputs) or calculating the distance from object 1388 to a surface of covering 1326 and/or detector 1324. In some cases, determining distance D may include detecting the power of the reflected radiation received by the deflector (e.g., as compared to the power of the emitted radiation 1370). Similarly, determining distance D may include determining a distance that radiation emitted by emitter 1322 travels from the emitter to the object and from the object from to the detector (e.g., approximately 2D) after being reflected by the object.

In addition, detector 1324 may receive ambient radiation 1372 incident upon the outer surface of covering 1326 and passing through (or filtered by) covering 1326 and incident upon detector 1324. The term "radiation" as used herein may describe electromagnetic radiation, light, fluorescent light, incandescent light, visible light, ambient light (visible and/or IR), and/or infrared (IR) light (e.g., ambient IR light, emitted IR light, reflected IR light, refracted IR light, modulated IR light and/or emitted modulated IR light).

For instance, FIG. 13 shows ambient radiation 1372 which may include ambient infrared and/or ambient visible light. Ambient light (e.g., ambient radiation 1372) may be described as electromagnetic radiation having a wavelength, frequency, and an intensity (e.g., an amplitude, a level, or a magnitude) of ambient incandescent light, fluorescent light, visible light, and/or infrared (IR) light. Ambient light may include electromagnetic radiation in a visible light spectrum (e.g., having visible light wavelength and/or frequency) and electromagnetic radiation in an IR light bandwidth (e.g., having IR light wavelength and/or frequency). For electromagnetic radiation, frequency is inversely proportional to wavelength. Thus, herein the term "bandwith" (or "band" for short) may be used to refer to a bandwidth of frequency or a spectrum of wavelength related to such bandwith. The infrared part of the electromagnetic spectrum may cover the range from roughly 300 GHz (1 mm) to 400 THz (750 nm). The visible light spectrum may include what a typical human eye will respond to, such as wavelengths from 400 to 700 nm, although some people may be able to perceive wavelengths from 380 to 780 nm.

It can be appreciated that, ambient visible light and ambient infrared light may be emitted by a fluorescent type light bulb, such as a bulb that uses an arc of electrical energy thought a gas to produce a larger amount of visible light (e.g., visible light photons) than IR light at a low heat. Comparatively, ambient visible light and ambient infrared light may be emitted by an incandescent type light bulb, such as a bulb that uses a heated filament to produce a larger amount of IR light than visible light at a high heat. Specifically, the incandescent type bulb emits a greater intensity of IR radiation (and heat) from a filament by using an electrical current running through the resistive filament, as compared to a lesser intensity of IR radiation emitted from gas molecule electrons dropping quantum excitation states in a fluorescent bulb using an electrical voltage arc to excite the electrons. Thus, an intensity of ambient visible light may be proportional to, related to, based on, determined from, calculated from, or otherwise derived from an intensity or level of ambient IR light from an ambient of fluorescent light bulbs and/or incandescent light bulbs. More particularly, such ambient light may have electromagnetic radiation in or at visible light and IR light wavelength peaks, spectrums and/or bandwidths. In some cases, a visible light wavelength bandwidth may be separated from an IR light wavelength bandwidth by a threshold wavelength or frequency. The threshold may be described as dividing the two bandwidths; and may be included in either, both, or neither bandwidth.

FIG. 13 shows detector 1324 including sensor 1350, sensor 1352, and filter 1356. Filter 1356 may have transmissivity properties for different wavelengths, wavelength bands (e.g., visible light and IR light), wavelength peaks, frequencies, frequency bands and/or frequency peaks of electromagnetic radiation. In some cases, filter 1356 may be a filter with a coating having transmissivity properties that filter out visible light, or pass only infrared light. Filter 1356 may have a coating such as described above for covering 1326 (e.g., a coating similar to coating 1328), but having the transmissivity properties described above for filter 1356. Filter 1356 may have the transmissivity properties described for FIG. 15B.

Filter 1356 may be described as a passband filter for IR light, but not passing visible light, such as to pass IR light from incandescent bulbs and fluorescent bulb, as well as radiation 1370 and 1374, but not to pass visible light from incandescent bulbs and fluorescent bulb. According to embodiments, filter 1356 may pass only IR light (e.g., only radiation in the IR band).

Sensor 1350 may be described as a sensor configured to detect electromagnetic radiation from emitter 1322, and ambient radiation 1372. For example, sensor 1350 may be able to detect radiation 1374 and radiation 1372 as filtered by covering 1326. Thus, sensor 1350 may be described as configured to detect electromagnetic radiation from emitter 1322, and/or ambient radiation 1372 when combined sensor 1320 or detector 1324 is configured to sense light, ambient light, and/or visible light.

Specifically, being "configured to detect" as described herein may describe the capability of a sensor to detect or sense different wavelengths, wavelength bands (e.g., visible light and IR light), wavelength peaks, frequencies, frequency bands and/or frequency peaks of electromagnetic radiation depending on the wavelengths of emitted radiation, modulation of emitted radiation, and transmissivity of filters between the electromagnetic radiation and the sensor. Moreover, the terms "processing logic" as described herein may describe an apparatus, an electronic device, a processor, processing logic, passive circuitry, active circuitry, electronic hardware, software, a system, a module, a component, a processor, a memory, registers and/or a combination of any or all of the above. Similarly, the term "sensor" may include the above descriptions for processing logic. Also, use of the term "detect" and derivations therefrom may be similar to that described herein for use of the term "sense" and derivations thereof, and vice versa. Moreover, use of the term "scale" or "scaling" may describe using a scale value or scalar stored in a memory, logic, processing logic, register, or scaler to multiply, increase, or decrease the amplitude or intensity of a signal or value (e.g., such as a detected or sensed intensity or amplitude). In some cases, scaling may describe attenuating or amplifying a signal (such as an output of a sensor or photodiode) to apply a "gain" to the signal, such as using processing logic, software, and the like. Likewise, a "scaler" may describe a signal attenuator, resistor, divider or amplifier.

According to some embodiments, sensor 1350 may be configured to detect electromagnetic radiation from a source other than emitter 1322 when combined sensor 1320 is sensing visible light, such as by covering 1326 allowing the visible light to be detected or sensed by sensor 1350. For example, when sensing light, such as ambient light, sensor 1350 may be configured to detect ambient radiation 1372 including ambient visible light and ambient IR light, but not to detect radiation 1374, because emitter 1322 is not emitting, is not turned on, is covered, is not exposed, or is filtered out of the signal detected by sensor 1350 (such as by being filtered out by logic 1330). In this case, sensor 1350 may be described as an ambient visible light and ambient IR light sensor. Sensor 1350 may be used to sense ambient light, ambient visible light, and/or to perform ALS.

Logic 1330 may be coupled to detector 1324 and emitter 1322 by couplings such as signal lines, electronic wires, electronic traces, cables, and the like for sending and receiving power, grounding, signals and the like between logic 1330 and emitter 1322 and/or detector 1324. In some cases, the coupling 1332 between logic 1330 and emitter 1322 may allow logic 1330 to modulate the emitter IR light and/or to turn the emitter on and off. Also, coupling 1332 may allow logic 1330 to control or sense when emitter 1322 is emitting, not emitting, and/or modulating radiation 1370. For example, see FIGS. 16 and 17.

Sensor 1352 may be a sensor as described above for sensor 1350, except that sensor 1352 is covered with or has filter 1356 disposed between sensor 1352 and radiation 1370, 1374, and 1372. Thus, sensor 1352 may detect electromagnetic radiation from radiation 1370, radiation 1374, and/or ambient IR radiation from radiation 1372, but may not receive, detect, or sense visible light from radiation 1372.

According to some embodiments, sensor 1352 is configured to detect radiation 1372, but not radiation 1370, or radiation 1374 (e.g., by emitter 1322 not emitting, not being turned on or being covered). In this case, although sensor 1352 receives ambient IR light, but does not receive light from radiation 1372 and 1374. In this case, sensor 1352 may be described as an ambient IR light sensor. Sensor 1352 may be used to sense ambient light, ambient IR light, and/or to perform ALS.

In some cases, sensor 1352 is configured to detect radiation 1370 or radiation 1374 (e.g., by emitter 1322 emitting radiation 1370 which is reflected by object 1388), but not radiation 1372 (e.g., by subtracting or filtering out ambient visible and infrared light from radiation 1372). In this case, although sensor 1352 may receive IR light from radiation 1372 and 1374, the IR light from radiation 1372 may be filtered out by logic 1330. For instance, radiation 1370 may be IR radiation modulated at a frequency of a modulation signal, such as a square wave, sine waver, or other modulation signal waveform (such as by being modulated by a modulation signal at a frequency between 1Hz and 300 KHz, such as 5 KHz or 200 KHz). Thus, IR light from radiation 1372 may be filtered out by determining a modulation frequency or waveform of radiation 1374 and subtracting ambient IR from radiation 1372 from modulated radiation 1374. This subtraction may be performed by bandpass filtering to pass signals at the modulation frequency and/or modulated frequency of modulated radiation 1374, but not to pass the frequency of the ambient light. In this case, sensor 1352 may be described as a transmitted or emitted IR light sensor. Sensor 1352 may be used to sense proximity of the object to combined sensor 1320.

Thus, sensor 1352 may be described as configured to detect radiation from emitter 1322 by being configured with covering 1326, filter 1356, and logic 1330, when combined sensor 1320 is sensing proximity. However, in this instance, sensor 1352 is not configured to detect or sense either visible light or ambient IR light.

Figure 14:
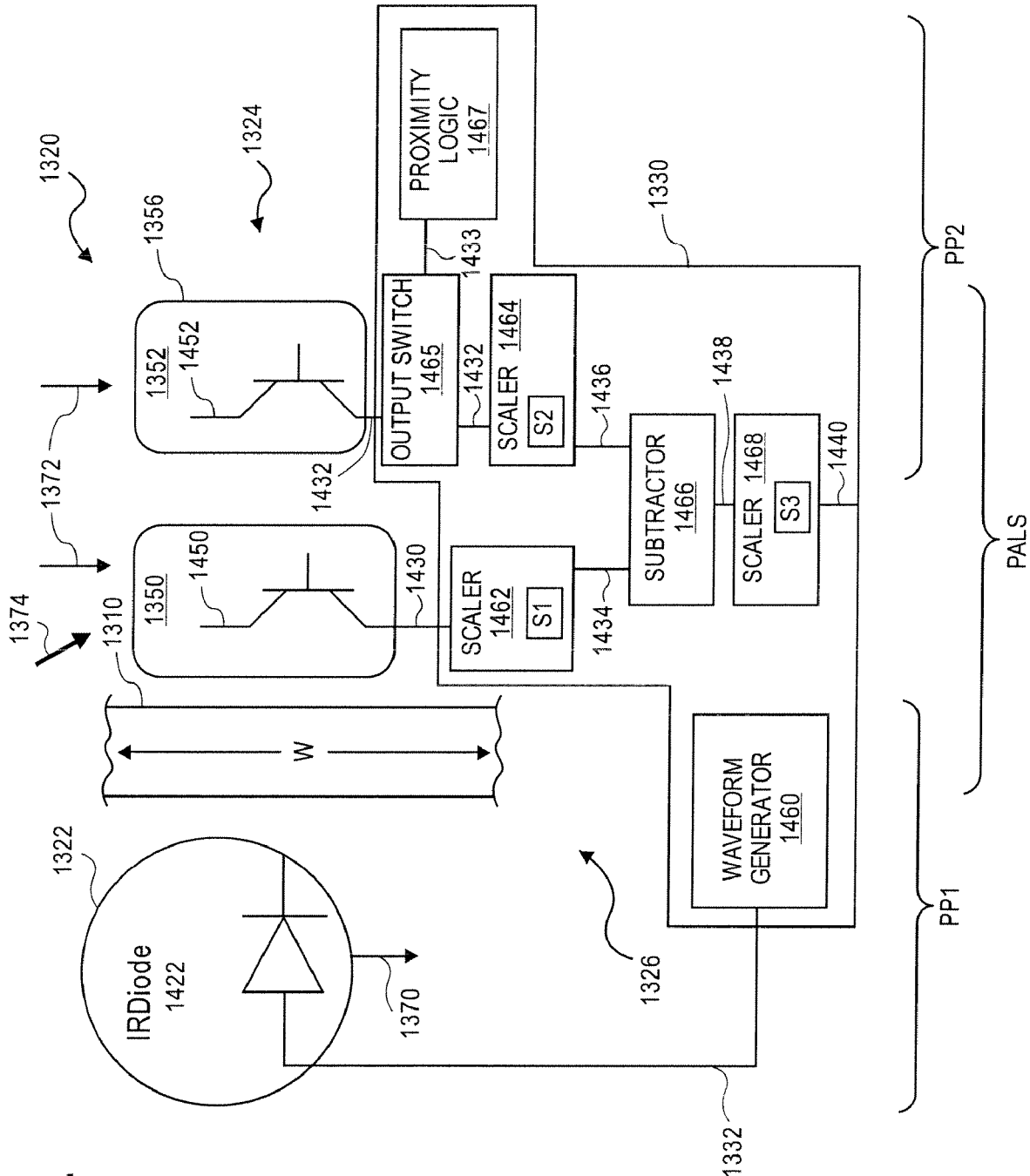
FIG. 14 is a schematic top view of a combined proximity sensor and ambient light sensor in accordance with one embodiment of the invention.

FIG. 14 is a schematic top view of a combined proximity sensor and ambient light sensor in accordance with one embodiment of the invention. FIG. 14 also shows output switch 1465 for distinguishing or switching between output 1432 between scaler 1464 and proximity logic 1467, such as by using time domain multiplexing (TDM). This may be described as filtering to pass signals at the modulation frequency. For example, during proximity mode, switch 1465 may switch output 1432 to proximity logic 1467. Alternatively, during ALS mode or ambient visible light sensing mode, switch 1465 may switch output 1432 to scaler 1464. Switch 1465 may include logic and circuitry described for logic 1330. In some cases, switch 1465 may include a multiplexer coupled to generator 1460, such as by a coupling similar to coupling 1332, to switch output 1432 to scaler 1464 when emitter 1322 is turned off (e.g., in ambient light sensing mode) and to proximity logic 1467 (e.g., in proximity sensing mode). Specifically, switch 1465 may be used to time-slice and multiplex output 1432 by sending output 1432 to logic

1467 during the slice of time when emitter 1322 is emitting IR, and by sending output 1432 to scaler 1464 during the slice of time when emitter 1322 is not emitting IR. Switch 1465 may be optional as output 1432 may be split (having equal amplitude) to be received by logic 1467 and scaler 1464 in both modes.

FIG. 14 shows combined sensor 1320 from above, including emitter 1322, fence 1310, cover 1326, detector 1324, and logic 1330. As described above for FIG. 13, diode 1422 of emitter 1322 may be turned on and off by logic 1330, or otherwise controlled to emit IR or modulated IR, such as described below for FIGS. 16 and 17. It can be appreciated that although logic 1330 is shown beside sensors 1350 and 1352, logic 1330 may be disposed at different locations adjacent to, or underneath those sensors. For instance, logic 1330 may be part of processing logic or circuitry disposed on or below surface 1342 and/or surface 1344, at a location other than where it is shown in FIG. 14. FIG. 14 shows emitter 1322 including IR diode 1422 (e.g., an IR LED) for emitting radiation 1370.

FIG. 14 also shows sensor 1350 including phototransistor 1450, and sensor 1352 including phototransistor 1452. Phototransistors 1450 and 1452 may be similar phototransistors, such as phototransistors capable of sensing visible light and radiation 1374 with equal or substantially equal sensitivity. However, as noted above for FIG. 13, those phototransistors may be configured by or controlled by filter 1356, covering 1326, and/or logic 1330 to only sense ambient light, ambient visible light, ambient IR and/or radiation 1374. According to embodiments, phototransistors may convert photons of incident ambient light and emitted radiation (e.g., reflected and refracted IR light) into an electrical signal output (e.g., having data, frequencies, and/or wavelengths proportional, equal or according to the frequencies, and/or wavelengths of the light and radiation received).

FIG. 14 shows logic 1330 including scaler 1462, scaler 1464, subtractor 1466 and scaler 1468. FIG. 14 shows sensor output 1430 output by sensor 1350 and received by scaler 1462. Similarly, sensor output 1432 is output by sensor 1352 and received by scaler 1454. Scaler output 1434 is output by scaler 1462 and received by subtractor 1466. Similarly, scaler output 1436 is output by scaler 1464 and received by subtractor 1466. Subtractor output 1438 is output by subtractor 1466 and received by scaler 1468. Finally, scaler output 1440 is output by scaler 1468.

Scaler 1462 is shown including scale value S1, such as a value for scaling output 1430 to determine, create or calculate value 1434. Similarly, scaler 1464 is shown including scale value S2, such as a value for multiplying or scaling output 1432 to determine, create or calculate value 1436. Scalers 1462 and 1464 may include processing logic as described herein. Similarly, scale value S1 and scale value S2 may be stored, written to, or saved in memory, registers and/or processing logic as described herein. Thus, scaler 1462, 1464, value S1 and/or value S2 may be used to scale the outputs of sensors 1350 and 1352 so that the ambient IR detected by both sensors can be scaled to an equal intensity (e.g., equal with respect to an amplitude at one or more similar wavelengths) or substantially equal intensity. Herein, the term "substantial" may refer to 100 percent or all of value, or, in some cases, a range within 1, 2 or 5 percent of that value. Conversely, the term "insubstantial" may refer to a zero or null valued, or, in some cases, a range within 1, 2 or 5 percent of that value.

Subtractor 1466 may be used to subtract outputs 1434 and 1436. For example, where the ambient infrared received by sensors 1350 and 1352 are scaled to equal intensities or levels, subtractor 1466 may subtract output 1436 from output 1434 to determine, create or calculate output 1438 that excludes the ambient infrared signals detected and/or includes only the ambient visible light. Thus, because the IR transmissive link (e.g., filter 1356 and/or covering 1326) has drastically different properties depending on the type of light (fluorescent, incandescent, etc.), different gains (e.g., scaling) can be applied to the output of each sensor (e.g., scaling of one or more of sensor outputs 1430 and/or 1432) before the outputs can be subtracted (e.g., by subractor 1466). Subtractor 1466 may include processing logic as described herein.

It is contemplated that the scaling and subtracting described above for combined sensor 1320, detector 1324, covering 1326, filter 1356, sensor 1350, sensor 1352, scaler 1462, scaler 1464, value S1, value S2, and/or subtractor 1466 may also be applied during emission, sensing and detection of radiation 1370 and 1374. Specifically, the concepts described above apply during emission of radiation 1370 and detection of radiation 1374, even when combined sensor 1320 is sensing ambient light or visible light. Thus, in addition to being able to subtract ambient infrared light, combined sensor 1320 is able to subtract emitted light from the ambient or visible light.

Scaler 1468 may scale or multiply subtractor output 1438 by value S3 to create scaler output 1440. For example, scaler 1468 may include processing logic to multiply output 1438 to scale down value 1438 when the amount of ambient IR received is greater than the amount of visible light (e.g., when the ratio of output 1438/output 1436 is greater than 1). This scaling may reduce the visible light determined or calculated by the sensor in instances where that value is overestimated because the ambient infrared is a greater portion of radiation 1372 than the ambient visible light.

Logic 1330 also includes waveform generator 1460 for generating a modulation signal or frequency to modulate IR light transmitted by emitter 1322. Waveform generator 1460 may generate a modulation signal as described for coupling 1332, sensor 1352, intensity D of FIG. 16, and/or intensity E of FIG. 17.

It is considered that proximity logic 1467 may determine a proximity of object 1388 from the distinguished reflected modulated light (e.g., from output 1433 from radiation 1374 distinguished from ambient IR by it's modulation frequency) when in proximity mode by comparing the distinguished reflected modulated light to one or more threshold values (e.g., using one or more comparators of logic 1467, such as to compare output 1433 to the values). A setting of a display illuminator may be decreased if the distinguished reflected modulated light is greater than the threshold value (e.g., indicating the sensor is close to the object) to save power or battery life.

Also, it is considered that logic 1330 may determine a visible light intensity of ambient radiation 1372 from the visible light detected (e.g., from output 1438 or 1440) when in ALS mode by comparing the visible light detected to one or more threshold values (e.g., using a comparator of logic 1330, such as to compare output 1440 to the values). A peak intensity (e.g, the highest amplitude within the visual wavelength band), average intensity (e.g, average of the amplitude within the visual wavelength band), area under the intensity curve (e.g., area under intensity B, scaled or not scaled by S3) within the visual wavelength band (e.g., determined by a sum of the intensity values, integration, and/or processing logic, such as a capacitor integrator) may be compared to the threshold value. A setting of a display illuminator may be decreased if the visible light detected is less than the threshold value (e.g., indicating the sensor is close to the object) to save power or battery life.

It can be appreciated that according to some embodiments, combined sensor 1320 may be a combined proximity sensor and ALS able to sense proximity and the ALS using only a single emitter (emitter 1322) and only two sensors or phototransistors. To this end, combined sensor 1320 may be described as having ALS portion and a proximity sensor portion which overlap or share at least a cover, a fence, a sensor (e.g., phototransistor), a filter, and/or processing logic). The ALS portion (see PALS of FIGS. 13-14) may include two sensors or phototransistors (e.g., sensors 1350 and 1352, or phototransistors 1450 and 1452), one with a filter (e.g., filter 1356 and optionally cover 1326) having a passband that only passes IR, and one with a filter (e.g., cover 1326) having a passband that passes both IR and visible light (VL). Proximity sensor portion (see PP1 and PP2 of FIGS. 13-14 which combine to form the proximity sensor portion) of the combined sensor may include IR emitting diode 1422 and one of the same sensors or phototransistors as the ALS portion (e.g., sensor 1352, or phototransistor 1452) having a filter having a passband that only passes IR. The phototransistor and filter used to sense proximity (e.g., radiation 1374) by the proximity portion during a proximity sensing mode may also be the same phototransistor and filter (having a passband that only passes IR) used by the ALS portion of the sensor to sense ambient visible light (e.g., by sensing ambient IR to be subtracted from the ambient IR and visible light of radiation 1372) during a light sensing mode. Thus, the proximity sensor portion overlaps the ALS sensor portion (e.g., by using the same sensor 1352 (or phototransistor 1452), circuit board area, traces or signal lines, fence, and related circuitry.

As noted above, Emitter 1322 may be an infrared (IR) light emitter emitting radiation 1370, a portion of which passes through cover 1326 (e.g., some of which may become radiation 1374 incident upon the cover), and another portion which is refracted by cover 1326 as radiation 1372. Thus, fence 1310 may be used to prohibit, remove or reduce a substantial amount of emitted radiation 1370 from being refracted into a proximity sensor and the ALS, or combined proximity sensor and ALS (e.g., by physically subtracting, inhibiting, reducing the wavelength of light emitted from passing through the fence). Fence 1310 may be described as removing the emitted radiation 1370 from reaching the detector, prior to the emitted radiation passing through cover 1326. Fence 1310 may extend from the covering (e.g., surface 1327) to below a location where the emitter radiation refracted by the covering would reach either of sensors 1350 or 1352 (e.g., phototransistors 1450 or 1452), to minimize reflection of the refracted radiation into those sensors.

FIG. 14 shows fence 1310 having width W. Width W may be a width of between 1 millimeter and 30 millimeters. FIG. 13 also shows fence 1310 having height H and thickness TH. Height H may be a height between 1 millimeter and 10 millimeters. Thickness TH may be a thickness between 0.01 millimeters and 2 millimeters. It can be appreciated that other dimensions for height H, thickness TH, and width W may be used as appropriate for fence 1310.

Fence 1310 is shown extending into groove 1312 below surface 1342 and surface 1344 and up to inner surface 1327 of covering 1326. Surface 1342 may be a surface on which emitter 1322 is disposed or mounted. Surface 1344 may be a surface upon which detector 1324 is disposed or mounted. Surface 1342 and surface 1344 may be parallel surfaces or surfaces that are not parallel but have different heights with respect to the bottom of groove 1312.

Fence 1310 may be coupled to groove 1312 such as by being attached, bonded, adhered, glued, removably attached, permanently attached (e.g., such as being removed only by damaging surface 1342, 1344, and or groove 1312) to groove 1312. Specifically, fence 1310 may be coupled to groove 1312 by an adhesive, bonding, heat processing (such as to melt or combine the material of fence 1310 and/or groove 1312), and/or mechanically disposed to be retained in groove 1312 (e.g., such as by having size tolerances with respect to thickness TH and height H that maintain fence 1310 in groove 1312 even during flexing of surfaces 1342, 1344, groove 1312 and/or surfaces of covering 1326).

Fence 1310 may be coupled to inner surface 1327 (or a groove in the inner surface) of covering 1326 similarly to the description above for fence 1310 being coupled to groove 1312. In addition, fence 1310 may be adjacent to, or touching, inner surface 1327 of covering 1326. In some cases, adhesive used to attach or couple fence 1310 to surface 1327 and/or groove 1312 may be adhesive or other material extending outward from surface 1327, 1342 and/or 1344 adjacent to fence 1310 to form a ridge to retain the fence in position (e.g., such as without having the adhesive dry while touching the fence).

Also, it is considered that during use of combined sensor 1320, and insubstantial gap may exist between fence 1310 and surface 1327, such as a gap through which an insubstantial amount of radiation 1370 is refracted by surface 1327 and received by detector 1324. For example, an amount of refracted radiation 1372 may be received by detector 1324 which effects proximity distance and/or ambient light determinations or calculations by less than five percent. Such a gap may occur during flexing of surface 1342, groove 1312, surface 1344 and/or surface 1327.

According to embodiments, a coupling similar to that described for coupling fence 1310 to groove 1312, may also exist at surface 1327. Similarly, a coupling such as described above between fence 1310 and surface 1327 may exist between fence 1310 and surface 1342 and/or 1344. Also, the couplings shown may be reversed. In some cases, the couplings to a groove or a surface described may exist between one or both ends of width W of fence 1310 and a sidewall surface.

Fence 1310 may comprise a plastic, metal, alloy, organic, inorganic, semiconductor, conductive, or non-electrically conductive material. Moreover, in some cases, the material of fence 1310 may be the same material as that of surface 1327, 1342 and/or 1344. For example, fence 1310 may be an extension of the material that forms surface 1342 and/or surface 1344. Likewise, fence 1310 may be an extension of the material that forms covering 1326 and/or surface 1327.

Fence 1310 may have transmissivity properties that do not allow for any, prohibit, or substantially reduce reflection or refraction of radiation 1327 by surface 1327, covering 1326 or coating 1328. For example, fence 1310 may be 100% non-transmissive for radiation 1370 or infrared light. It can be appreciated, that the material of fence 1310 or a coating on the material of fence 1310 may provide the transmissivity properties of fence 1310. For example, fence 1310 may be coated with a film, spray, or other coating as described above for covering 1326 (e.g., a coating similar to coating 1328, but on the outside surface of fence 1310), but having the transmissivity properties described above for fence 1310.

In accordance with embodiments having a proximity detector separate from an ambient light sensor (ALS), a fence similar to fence 1310 may be disposed between the proximity emitter and the proximity sensor, and another such fence may be disposed between the proximity emitter and the ALS. For example, the emitter and sensors may be in a linear relationship where the proximity sensor is between the emitter and the ALS, and a fence is between the proximity sensor and each of the emitter and the ALS. In this case, the ALS may be an ALS as known in the art, such as an ALS that does not have sensors to determine proximity or receive radiation 1370 or 1374.

FIG. 15A is a graph showing transmissivity verse wavelength for a cover in accordance with one embodiment of the present invention. FIG. 15A shows transmissivity 1502 of cover 1326 or coating 1328 with respect to threshold wavelength ($W_{IR}$), visible light bandwidth 1510, and IR bandwidth 1530. For example, threshold wavelength ($W_{IR}$) may be a wavelength (e.g., corresponding to a "cutoff" wavelength or frequency) between an upper threshold wavelength of visible light bandwidth 1510 and a lower threshold wavelength of IR bandwidth 1530. Within bandwidth 1510 transmissivity 1502 is approximately 10%. After wavelength $W_{IR}$, transmissivity 1502 rapidly increases to approximately 60%. Within bandwidth 1530 transmissivity 1502 is approximately 60%. Other values are contemplated for transmissivity 1502, such as values approximately 5%, 15%, or 20% within bandwidth 1510; and/or approximately 40%, 50%, 70% or 80% within bandwidth 1530. The term "approximately" may refer to the specific valued noted herein, or, in some cases, a range within 1, 2 or 5 percent of that value. Thus, cover 1326 may be described as a passband filter for passing ambient light including ambient visible light and ambient IR. Cover 1326 may also be described as a passband for passing emitted radiation 1370 and 1374.

It can be appreciated that wavelengths in bandwidth 1510 (e.g., below $W_{IR}$ 1520) may be described as a wavelength band of visible light, such as a band including the wavelength peak for visible light from various incandescent light, filament light, and fluorescent light bulbs. Also, the wavelengths in bandwidth 1530 (e.g., above $W_{IR}$ 1520) may be described as a wavelength band of ambient infrared light as well as radiation 1370. For instance, the wavelength above $W_{IR}$ may include peak frequencies for ambient IR emitted by various fluorescent type and incandescent type light bulbs, as well as IR wavelengths for radiation 1370.

Figure 15B:
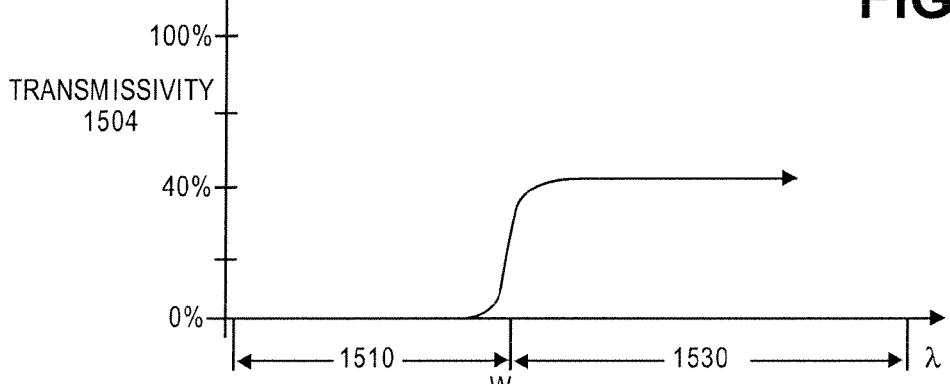
FIG. 15B is a graph showing transmissivity verse wavelength for an infrared passband filter in accordance with one embodiment of the present invention.

FIG. 15B is a graph showing transmissivity verse wavelength for an infrared passband filter in accordance with one embodiment of the present invention. FIG. 15B shows transmissivity 1504 of filter 1356. Transmissivity 1504 is approximately 0% in bandwidth 1510 (e.g., below $W_{IR}$ 1520), but increases rapidly (e.g., approximately at $W_{IR}$ 1520) to approximately 40% in bandwidth 1530 (e.g., above $W_{IR}$ 1520). Other values are contemplated for transmissivity 1504, such as values approximately 1%, 2%, or 5% within bandwidth 1510; and/or approximately 20%, 30%, 50% or 60% within bandwidth 1530. Thus, filter 1356 may be described as a passband for ambient IR, and IR of radiation 1370. However, filter 1356 may be described as having no or substantially zero transmissivity for visible light and/or visible light wavelengths (e.g., those below the infrared bandwidth).

Figure 15C:
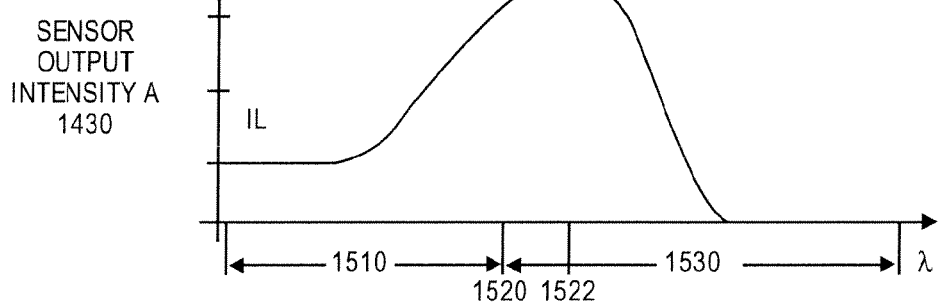
FIG. 15C is a graph showing intensity versus wavelength for a visible light and infrared sensor output in accordance with one embodiment of the present invention.

FIG. 15C is a graph showing intensity versus wavelength for a visible light and infrared sensor output in accordance with one embodiment of the present invention. FIG. 15C shows an example of intensity A for sensor output 1430. For instance, FIG. 15C shows an example of the intensity or amplitude of radiation 1374, and/or 1372 received by sensor 1350 through covering 1326 and output at 1430. Intensity A includes radiation (e.g., ambient visible light) in visible light bandwidth 1510, radiation at threshold wavelength ($W_{IR}$), and radiation within bandwidth 1530. Also, in cases where emitter 1322 is emitting, intensity A may include IR light of radiation 1374 within bandwidth 1530. Since the light received by sensor 1350 is filtered by covering 1326, intensity A may have a lower amplitude below wavelength 1520 as compared to that above wavelength 1520 for equal amplitudes of ambient IR and visible light incident upon covering 1326.

Figure 15D:
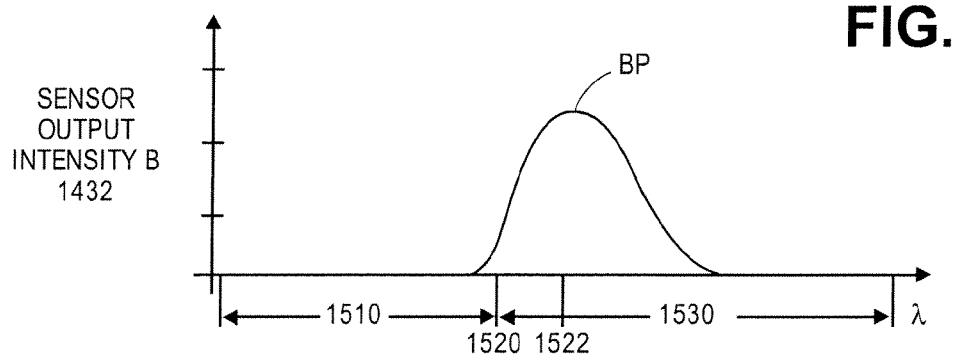
FIG. 15D is a graph showing intensity versus wavelength for an infrared sensor output in accordance with one embodiment of the present invention.

FIG. 15D is a graph showing intensity versus wavelength for an infrared sensor output in accordance with one embodiment of the present invention. FIG. 15D shows an example of intensity B of sensor output 1432. For example, intensity B may be an example of radiation 1372 received by sensor 1352 through covering 1326 and filter 1356 sensed by sensor 1352 and output at output 1432. Since filter 1356 has substantially zero transmissivity below wavelength 1520 but passes IR above wavelength 1520, the ambient visible light of intensity B will be substantially filtered out, while the ambient IR above wavelength 1520 will be present, although attenuated as compared to that for intensity A. In the IR band, intensity B is less than intensity A by a percent equal to that for transmissivity 1504, because filter 1356 filters the light received by sensor 1352, but does not filter the light received by sensor 1350.

Thus, by scaling the ambient IR of intensity B to have an amplitude (e.g., peak amplitude BP) similar to the peak amplitude of intensity A (e.g., peak AP) it is possible to subtract the scaled value of intensity B from intensity A to remove the ambient IR and determine (e.g., using processing logic and sensor outputs) or calculate the ambient visible light. It can be appreciated, this scaling and subtraction may also remove or subtract out radiation 1370 or 1374 from the ambient visible light. For example, the visible light may be equal to intensity A minus (x·intensity B), or determined according to the equation:

$$VL = A - xB \qquad \text{a)}$$

In the example described for FIGS. 15 through 15D, "x" may be equal to 2.5, or the inverse of transmissivity 1504 in the IR band. It can be appreciate that other values can be used depending on transmissivity 1502, transmissivity 1504, and/or ambient light sensing properties of sensors 1350 and 1352. Thus, the ratio of S2/S1 would be 2.5 in this example. In some cases, scaler 1462 and scale value S1 may be removed, such as where output 1430 is equal to output 1434. For instance, S2="x" in this case. Specifically, where the above ratio is 2.5, value S2 may be equal to 2.5 and scaler 1462 may be removed from logic 1330 (e.g., see FIG. 14).

Figure 15E:
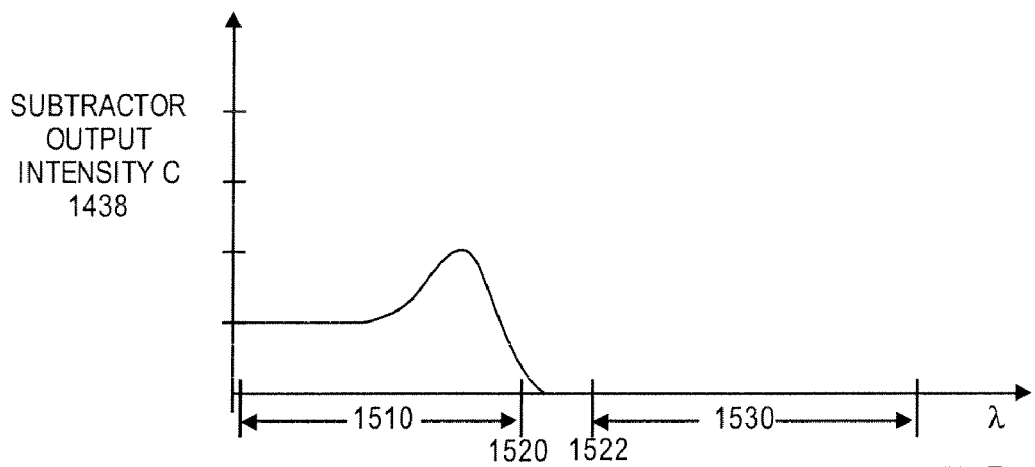
FIG. 15E is a graph showing intensity versus wavelength for a subtractor output of processing logic in accordance with one embodiment of the present invention.

FIG. 15E is a graph showing intensity versus wavelength for a subtractor output of processing logic in accordance with one embodiment of the present invention. FIG. 15E shows intensity C of subtractor output 1438 for processing logic 1330, such as where a scaled value of intensity B is subtracted from intensity A to determine, calculate or create intensity C. As the scaled value of the IR band has been subtracted out, intensity C includes the ambient visible light detected by combined sensor 1320 but does not include ambient IR. Moreover, intensity C does not include radiation 1370 or radiation 1374, as radiation 1370 or radiation 1374 are subtracted out by subtractor 1466 as well.

In addition, in some embodiments, the result of the subtraction may optionally be further scaled depending on the ration of ambient IR light to ambient visible light received by the detector. For instance, in some embodiments, intensity C may be further scaled depending on the amount of ambient infrared light detected by combined sensor 1320, such as to account for an amount that the detector overestimates what a person's eye sees or perceives of the incandescent visual ambient light, such as compared to florescent light. Thus, intensity C may be scaled down when the received ambient light is primarily for incandescent light as opposed to florescent or other non-incandescent light (e.g., a sort of auto-white balancing). In some cases, intensity C (e.g., output 1438) may be scaled by scaler 1468 (e.g., by scale value S3) to determine, create or calculate output scaled visible light (VL') (e.g., output 1440). Specifically, intensity C may be scaled by (e.g., scale value S3 may be) an incandescent light factor ($X_I$) or a fluorescent light factor ($X_F$) depending on the ratio of intensity ambient IR ($IR_A$) to ambient visible light ($VL_A$). According to embodiments, the ratio of $IR_A$ to $VL_A$ may be equal to or determined by the ratio of total power (e.g., summed or integrated over the entire frequency range), or the peak power (e.g., at a peak power frequency) of intensity B/intensity C. Also, the ratio of $IR_A$ to $VL_A$ may be equal to or determined by the ratio of total power (e.g., summed or integrated over the entire frequency range), or the peak power (e.g., at a peak power frequency) of the visual light bandwidth of intensity A over the IR bandwidth of intensity A. For example, when $IR_A/VL_A \leq 1$, the scaled visible light (VL') may be scaled or determined according to the equation:

$$VL'=X_I VL, \quad \text{b)}$$

Also, when $IR_A/VL_A > 1$, the scaled visible light (VL') may scaled or determined according to the equation:

$$VL'=X_F VL \quad \text{c)}$$

In the example described, $X_F$ may be greater than $X_I$, such as by a factor of 1.2 to 2.0 times greater. In some cases, $X_F$ may be 0.9 and $X_I$ may be 0.5.

For instance, as described above, an incandescent type bulb emits a greater intensity of IR radiation (and heat), as compared to a lesser intensity of IR radiation emitted from a fluorescent bulb. Thus, where more ambient IR light is detected than visible IR light, intensity C may be reduced in scale to accurately represent that the ambient light includes more visible light from incandescent type bulbs than from fluorescent type bulbs. In other words, the visible light from the incandescent bulbs does not appear as brighter to the human eye as the visible light determined or calculated (e.g., the intensity C or output 1438 is overestimated and can be scaled down). Alternatively, where the ratio of ambient IR to ambient visible light is equal to or less than 1, intensity C may be scaled down by less or not be scaled (or may not be reduced relative to scaling noted above) to accurately represent that the ambient light includes more visible light from fluorescent type bulbs than from incandescent type bulbs, which appears as bright to the human eye as the visible light determined or calculated. Scaler 1468 may provide such scaling.

Figure 16:
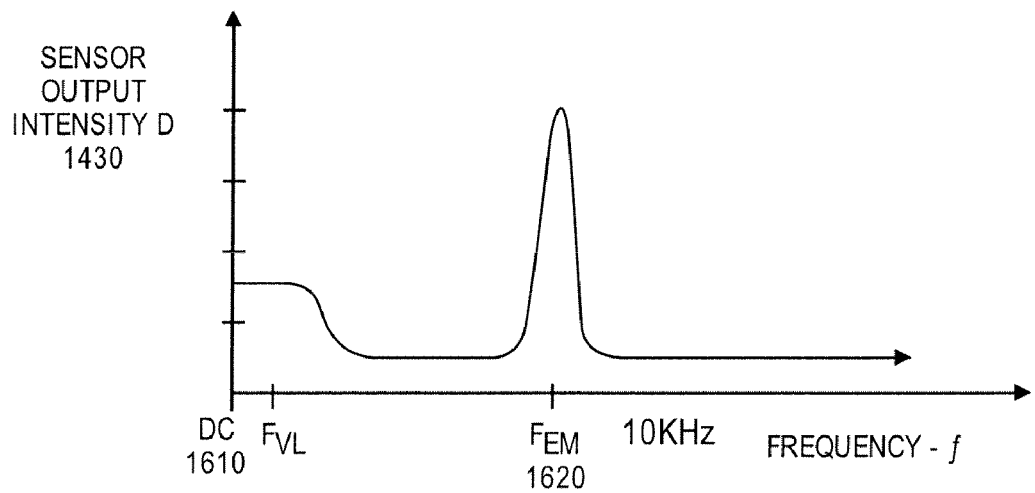
FIG. 16 is a graph showing intensity versus frequency for an infrared and visible light sensor output in accordance with one embodiment of the present invention.

As noted, radiation 1370 may be IR radiation modulated at a frequency, such as a frequency between 1Hz and 300 KHz. For instance IR light of radiation 1370 (e.g., light emitted by a diode or LED in an having an IR peak and/or in an IR bandwidth) may be transmitted at a modulation frequency of 1, 5, 10, 15, 20, or a range between any two of those numbers in KHz. For instance, FIG. 16 is a graph showing intensity versus frequency for an infrared and visible light sensor output in accordance with one embodiment of the present invention. FIG. 16 shows intensity D of sensor output 1430, such as an intensity when sensor 1430 is receiving radiation 1374 and radiation 1372. FIG. 16 shows modulator frequency $F_{EM}$ 1620, at which intensity D has a peak. Intensity D also includes an amplitude for the ambient at and near direct current (DC) frequency 1610.

Thus, IR light from radiation 1372 may be filtered out or distinguished from ambient light by determining a modulation frequency or waveform of radiation 1374 and subtracting ambient IR from radiation 1372 from modulated radiation 1374. For instance, TDM, a passband filter, a frequency filter, or other processing logic may be used to distinguish emitted IR light 1370 modulated with a first waveform at frequency $F_{EM}$ 1620 from ambient IR light (e.g., IR light having a different second waveform and/or at a different second frequency). Distinguishing the modulated signal from ambient IR may be performed according to processes known in the art for bandpassing modulated signals. Moreover, coupling 1332 between logic 1330 and emitter 1322 may allow logic 1330 to turn diode 1422 on and off according to the frequency of $F_{EM}$.

Figure 17:
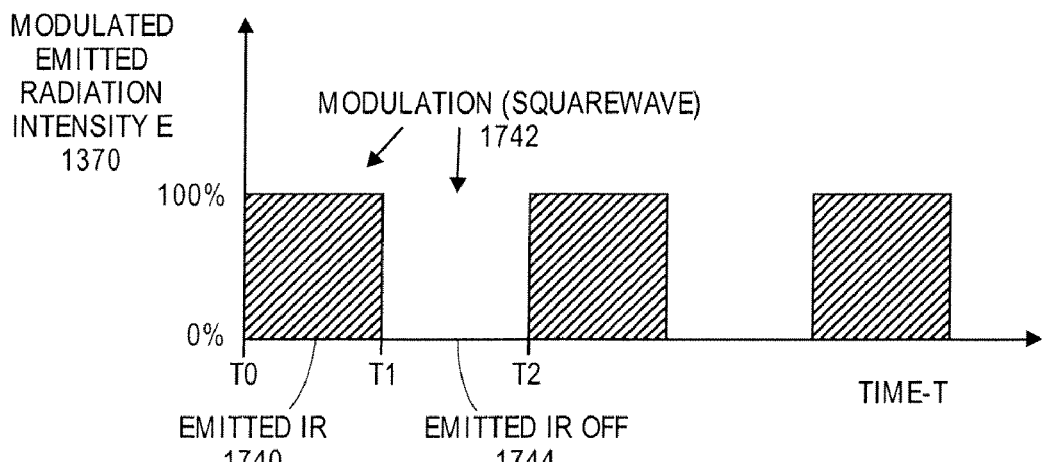
FIG. 17 is a graph showing intensity verse time for modulated emitter radiation and ambient light in accordance with one embodiment of the present invention.

FIG. 17 is a graph showing intensity verse time for modulated emitter radiation and ambient light in accordance with one embodiment of the present invention. FIG. 17 shows intensity E of modulated emitted radiation 1370. Intensity E includes a squarewave modulation at frequency $F_{EM}=1/$ (wavelength T2–T0), of IR light emitted by emitter 1322. Intensity E includes 100% of the emitted IR amplitude or emitted IR 1740 (e.g., diode 1422 turned on by forward biasing the diode using coupling 1332) during the time between T0 and T1. During this period, logic 1330 may turn on or activate emitter 1322 and may use sensor 1352, filtering, scaling, subtraction, etc. to select radiation 1374 to sense proximity D of object 1388. Also, Intensity E includes 0% of the emitted IR amplitude or the absence of emitted IR 1740 (e.g., diode 1422 turned off by zero or reverse biasing the diode using coupling 1332) during the time between T1 and T2. During this period, logic 1330 may turn off or deactivate emitter 1322 and may use sensor 1350, sensor 1352, filtering, scaling, subtraction, etc. to select visible light of ambient radiation 1372.

Thus, the emitter, waveform generator (e.g., modulation frequency), and processing logic (e.g., logic 1467) for detecting proximity may be shut down, powered off, or otherwise not operating or used during a light sensing mode (e.g., the period between T1 and T2). Alternatively, processing logic for detecting visible or ambient light (e.g., scaler 1462, scaler 1464, scaler 1468, and subtractor 1466), and sensor 1350 may be shut down, powered off, or otherwise not operating or used during a proximity sensing mode (e.g., the period between T0 and T1). Specifically, switch 1465 may be used to time-slice and multiplex the operation or output of sensor 1352 by slicing or switching time T (see FIG. 17) between emitted IR 1740 (sending output 1432 to logic 1467) and emitted IR off 1744 (sending output 1432 to scaler 1464), such as using the square waveform of modulation 1742.

The period between T0 and T1 may or may not be equal to the period between T1 and T2. Thus, modulation 1742 shows a squarewave of modulated emitter radiation 1370, such as a signal emitted by emitter 1322 and sensed during the period T0 to T1 to detect proximity, while ALS is detected during the period between T1 and T2. It is considered that this switching may occur in cases where the ALS portion (e.g., time T1 to T2) takes approximately 500 ms to react in low light conditions, and the proximity sensor portion is shut down during this time.

Distinguishing the emitted IR from ambient IR by detecting for emitted IR during one time period and for ambient IR during another may be described as TDM, timeslicing and multiplexing, and/or using a waveform filter. Also, although the use of intensity D and/or E to modulate emitted radiation 1370 describe processes for distinguishing the emitted IR from the ambient IR, it can be appreciated that other processes can be used.

Combined sensor 1320 may be defined by having portions of a proximity sensor that overlap with portions of an ambient light sensor. According to embodiments, a "combined sensor" include the description above for an integrated sensor. Thus, at least certain embodiments may provide the benefit of a combined sensor 1320 able to sense ALS and proximity using only two sensors and a single emitter, such as to reduce cost, complexity, processing logic, surface area use (e.g., the footprint of combined sensor 1320 on surface 1342 and 1344), the number of components that may fail, and/or the like. In addition, at least certain embodiments may use overlapping portions of the same sensor to sense ALS and proximity to reduce power consumption by having fewer components (e.g., sensors, phototransistors, circuit board area, traces length, and related circuitry), to reduce processing power consumption (e.g., by requiring less processing logic for the combined components), and thus may extend battery life by using less power to sense proximity and ALS. Also, at least certain embodiments may use overlapping portions to reduce power consumption by more accurately determining when to attenuate or change illumination levels of a display device and at what light level to illuminate the display, such as by providing a single sensor location from which to sense proximity and ALS. Specifically, at least certain embodiments may only require the cost to purchase, space to use, power to activate and use, and processing logic for two sensors (e.g., sensors, phototransistors, circuit board area, traces length, and related circuitry) to sense ALS and proximity instead of the three sensors required for a separate ALS and proximity sensor.

Moreover, it can be appreciated that at least certain embodiments of the combined sensor may provide proximity and/or ALS data to a processor or processing logic of an electronic device, a display device, or a data processing system. Thus, at least certain embodiments of the processor or processing logic can determine, based upon the data, whether to modify a setting of the data processing system. For instance, the processor or processing logic may compare the data from the proximity sensor to a threshold value and/or compare the data from the ALS to a threshold value (e.g., in order to interpret the data to predict activity of a user relative to the data processing system. Specifically, the comparison may be used to determine when and by how much to modify (e.g., by adjusting, increasing, decreasing, turning on, turning off, or leaving status quo) at least one of a setting of a display illuminator, a setting of a sound input or output parameter, a setting of processing of inputs from an input device, and/or a setting of a mode of the data processing system. In some cases, the data from the proximity sensor and/or ALS may indicate that the device or data processing system is proximate to a user's ear, hair, face or mouth, such as by sensing a very close proximity (e.g., 0-2 cm) at the earpiece/speaker, close proximity (e.g., 1 mm-15 cm) at the mouthpiece/microphone, normal or equal ALS mouthpiece/microphone and at the side of the device away from the user (e.g., to indicate the device is not in a pocket, case, or device holder), and/or very low ALS at the earpiece/speaker. In the cases where the device of data processing system is proximate to a user's ear, hair, face or mouth, the processor or processing logic may decrease or turn off the setting of a display illuminator, a setting of a sound input or output parameter, a setting of processing of inputs from an input device, and/or a setting of a mode of the data processing system.

Figure 18:
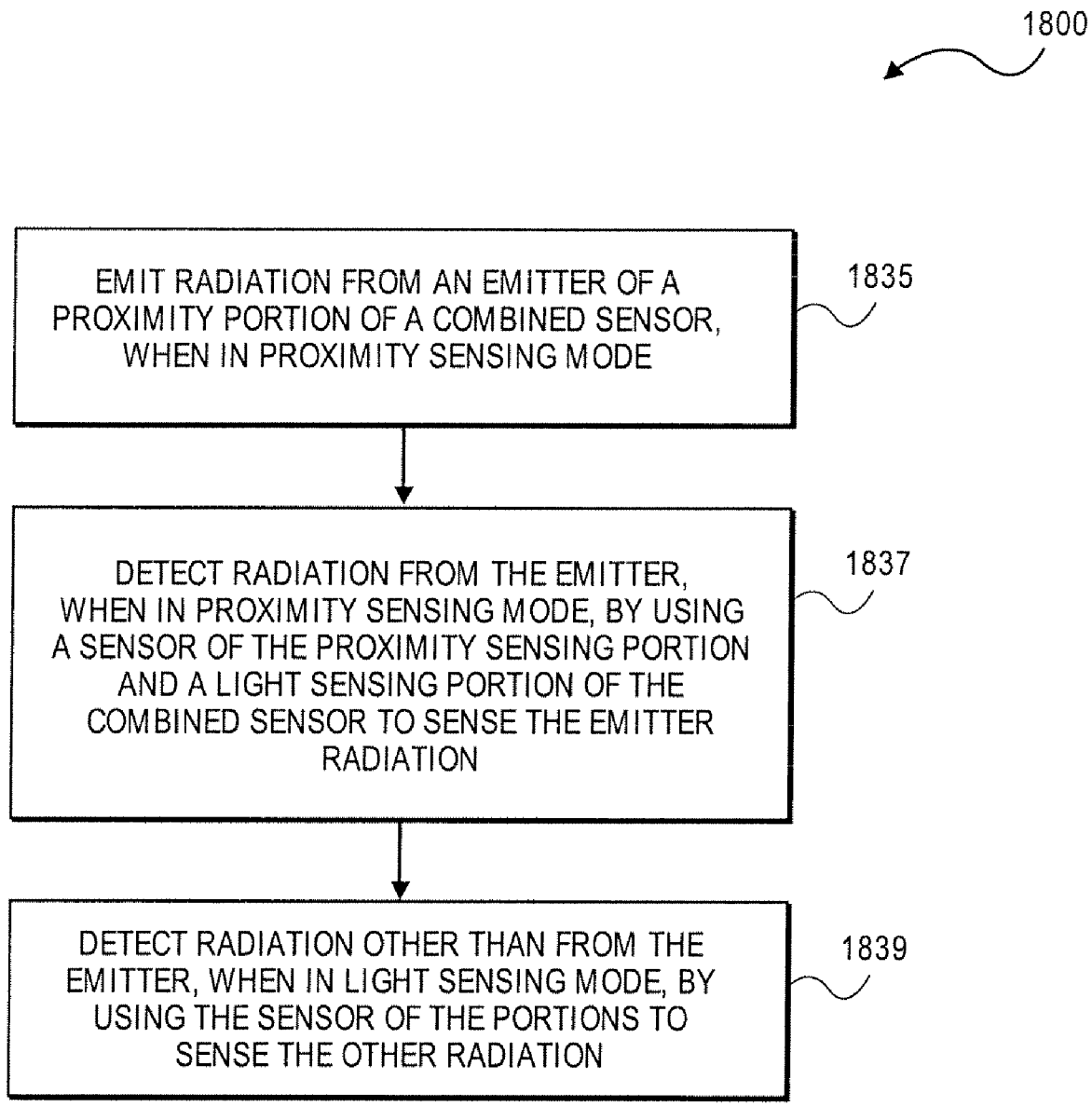
FIG. 18 is a flowchart which shows a method of operating a combined proximity sensor and ambient light sensor which is capable of detecting proximity of an object and visible light in accordance with one embodiment of the present invention.

FIG. 18 is a flowchart which shows a method of operating a combined proximity sensor and ambient light sensor which is capable of detecting proximity of an object and visible light in accordance with one embodiment of the present invention. FIG. 18 shows process 1800 which may be a process similar to that described above for FIG. 7C. Moreover, process 1800 may include using a single sensor or phototransistor to sense proximity, and to be combined with a second phototransistor to sense ambient or visual light. Hence, block 1835, 1837 and 1839 of FIG. 18 may correspond to blocks 135, 137 and 139 of FIG. 7C, respectively.

At block 1835, radiation from an emitter of a proximity portion of a combined sensor may be emitted, when the combined sensor is in proximity sensing mode. For example, block 1835 may describe emitter 1322 of proximity portion PP1 (e.g., see FIGS. 13 and 14) emitting radiation 1370 during the period between T0 and T1 (see FIG. 17) (e.g., during radiation 1740 or proximity sensing mode).

At block 1837, the radiation from the emitter is detected when in proximity sensing mode, by using a sensor of the proximity sensor portion that overlaps a light sensing portion of the combined sensor. Block 1837 may include detecting radiation 1374 (e.g., the reflection or refraction of radiation 1370 reflected and/or refracted by object 1388) during the period between and T0 and T1 (see FIG. 17) by using sensor 1352 of proximity sensing portion PP2 and overlapping light sensing portion PALS of sensor 1320 (see FIGS. 13 and 14). Specifically, phototransistor 1452 (e.g., having filter 1356 and covering 1326 between radiation 1374 and sensor 1352) may be used to sense radiation from emitter 1322 (e.g., radiation 1374).

At block 1839 radiation other than from the emitter is detected, when in light sensing mode, by using the sensor of the proximity sensing portion that overlaps the light sensing portion of the combined sensor. For example, block 1839 may include detecting radiation other than from emitter 1322 (e.g., detecting radiation other than radiation 1374) during the period between T1 and T2 (e.g., during light sensing mode) by using sensor 1352 (e.g., phototransistor 1452 having filter 1356 and coating 1326 between ambient radiation 1372 and filter 1356) of proximity sensing portion PP2 and overlapping light sensing portion PALS (as shown in FIGS. 13 and 14). For example, the light other than from the emitter may be ambient radiation 1372 and light sensing mode may be described as a mode that is not or that is other than proximity sensing mode. Also, light sensing mode may be described as a period when emitted IR 1740 or radiation 1370 is not emitted. Thus, it can be appreciated that the same phototransistor or sensor (e.g., phototransistor 1452 or sensor 1352) can be used by combined sensor 1320 to sense proximity as well as ambient light, such as by switching between or intermittently switching between proximity sensing mode (e.g., when emitter is emitting IR according to modulating frequency $F_{EM}$) and light sensing mode (e.g., such as when emitter 1322 is not emitting IR according to modulating frequency $F_{EM}$).

Moreover, it can be appreciated that although sensor 1352 has filter 1356 to band pass only IR radiation to the sensor, in alternate embodiments the concepts described for process 1800 may also apply to using sensor 1350 to sense both proximity and ambient light. For example, the output of sensor 1350 can be used at block 1837 to detect IR radiation from the emitter, and at block 1839 to detect radiation other than from the emitter, such as to detect IR radiation and visual light radiation during both modes. In this embodiment, sensor 1350 is part of portion PP2 and sensor 1352 is not. Thus, in this embodiment, at block 1837, the sensor of the portions may detect the radiation from the emitter but not detect (e.g., such as by subtracting or filtering out) ambient light radiation. Alternatively, at block 1839, the sensor of the portions may detect ambient light radiation but not detect (e.g., such as by not receiving because the emitter is not emitting or turned on, by subtracting out, or by filtering out) the emitter radiation.

In addition, according to embodiments, descriptions herein with respect to portable devices (e.g., see FIGS. 1-6), proximity, light levels (e.g., ambient light), generating detection of proximity and/or light levels (e.g., see FIGS. 7A-7D), using artificial intelligence (AI) logic on inputs from sensors to take actions (e.g., see FIG. 8), determining user activities based on input receive from sensors (e.g., see FIG. 9), automated responses to user activity based on input receive from sensors (e.g., see FIG. 10-11F), and digital processing systems for sensors (e.g., see FIG. 12) apply to combined sensor 1320, portions, components, logic, emitters and sensors thereof. Moreover, according to embodiments, descriptions herein with respect to placement and location of sensors; use of sensor data and determinations; and multiple sensors also apply to combined sensor 1320. For example, a combined sensor can be used at locations identified herein for a proximity and/or light level sensor, such as to substitute one combined sensor to take the place of two sensors (e.g, one proximity sensor and one light level sensor). Thus, each such substitution requires the reduced space, power, processing, and openings in the surface of the portable device of one combined sensor, as compared to the two sensors.

It will be appreciated that at least some of the sensors which are used with embodiments of the inventions may determine or provide data which represents an analog value. In other words, the data represents a value which can be any one of a set of possible values which can vary continuously or substantially continuously, rather than being discrete values which have quantum, discrete jumps from one value to the next value. Further, the value represented by the data may not be predetermined. For example, in the case of a distance measured by a proximity sensor, the distance is not predetermined, unlike values of keys on a keypad which represent a predetermined value. For example, a proximity sensor may determine or provide data that represents a distance which can vary continuously or nearly continuously in an analog fashion; in the case of such a proximity sensor, the distance may correspond to the intensity of reflected light which originated from the emitter of the proximity sensor. A temperature sensor may determine or provide data that represents a temperature, which is an analog value. A light sensor, such as an ambient light sensor, may determine or provide data that represents a light intensity which is an analog value. A motion sensor, such as an accelerometer, may determine or provide data which represents a measurement of motion (e.g. velocity or acceleration or both). A gyroscope may determine or provide data which represents a measurement of orientation (e.g. amount of pitch or yaw or roll). A sound sensor may determine or provide data which represents a measurement of sound intensity. For other types of sensors, the data determined or provided by the sensor may represent an analog value.

Figure 8:
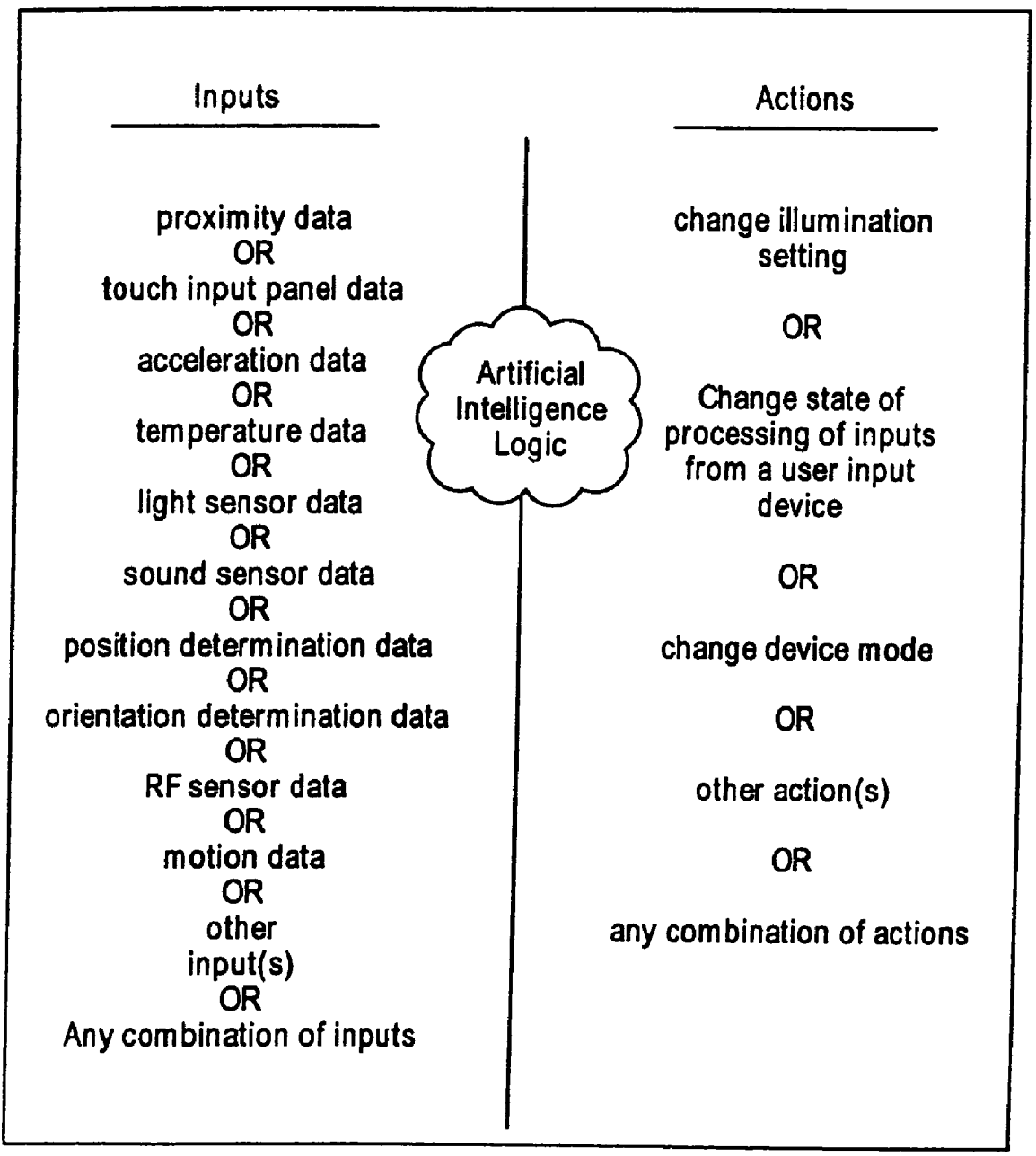
FIG. 8 is a block diagram of inputs and outputs for logic, such as artificial intelligence logic, in accordance with embodiments of the present invention.

FIG. 8 shows a diagram of various inputs from sensors that can be used and actions that can be performed in accordance with at least one embodiment of the invention. Any one of the devices described herein, including the devices shown in FIGS. 2, 3, 4, 5A and 5B, may operate in accordance with the use of artificial intelligence as represented by FIG. 8. One or more inputs on the left side of FIG. 8 are received from various sensors of a device and are input into the artificial intelligence (AI) logic. One or more actions on the right side of FIG. 8 may be implemented by the AI logic automatically in response to any combination of the inputs. In one implementation of this embodiment, the actions are implemented substantially immediately after the data is sensed by one or more sensors.

Exemplary inputs of FIG. 8 may include, for example, proximity data, proximity data and blob detect data (e.g., from a multipoint touch input screen), proximity data and accelerometer data, accelerometer data and blob detect data, proximity data and temperature data, proximity data and ambient light data, and numerous other possible combinations.

Exemplary actions of FIG. 8 may include, for example, turning off the backlight of the portable device's display, suppressing the user's ability to input at the user interface (e.g., locking the input device), changing the telephone's mode, and the like. It will be appreciated that combinations of the above actions may also be implemented by the AI logic. For example, the AI logic may both turn off the display's backlight and suppress the user's ability to input at the user interface. As another example, the proximity data from a proximity sensor may be used to adjust the frequency response of the output of a receiver's amplifier section. This adjustment would allow the amplifier section to compensate for the variation of frequency response which occurs as a result of the variation of the distance between a speaker and a user's ear. This variation is caused by the variation of signal leakage introduced by a varying distance between the speaker and the user's ear. For example, when the ear is close (in close proximity) to the speaker, then the leak is low and the base response is better than when the ear is not as close to the speaker. When the speaker is farther removed from the ear, the degraded base response may be improved, in at least certain embodiments, by an equalizer which adjusts the base relative to the rest of the output signal in response to the distance, measured by the proximity sensor, between the user's ear and the speaker which provides the final output signal.

Figure 11A:
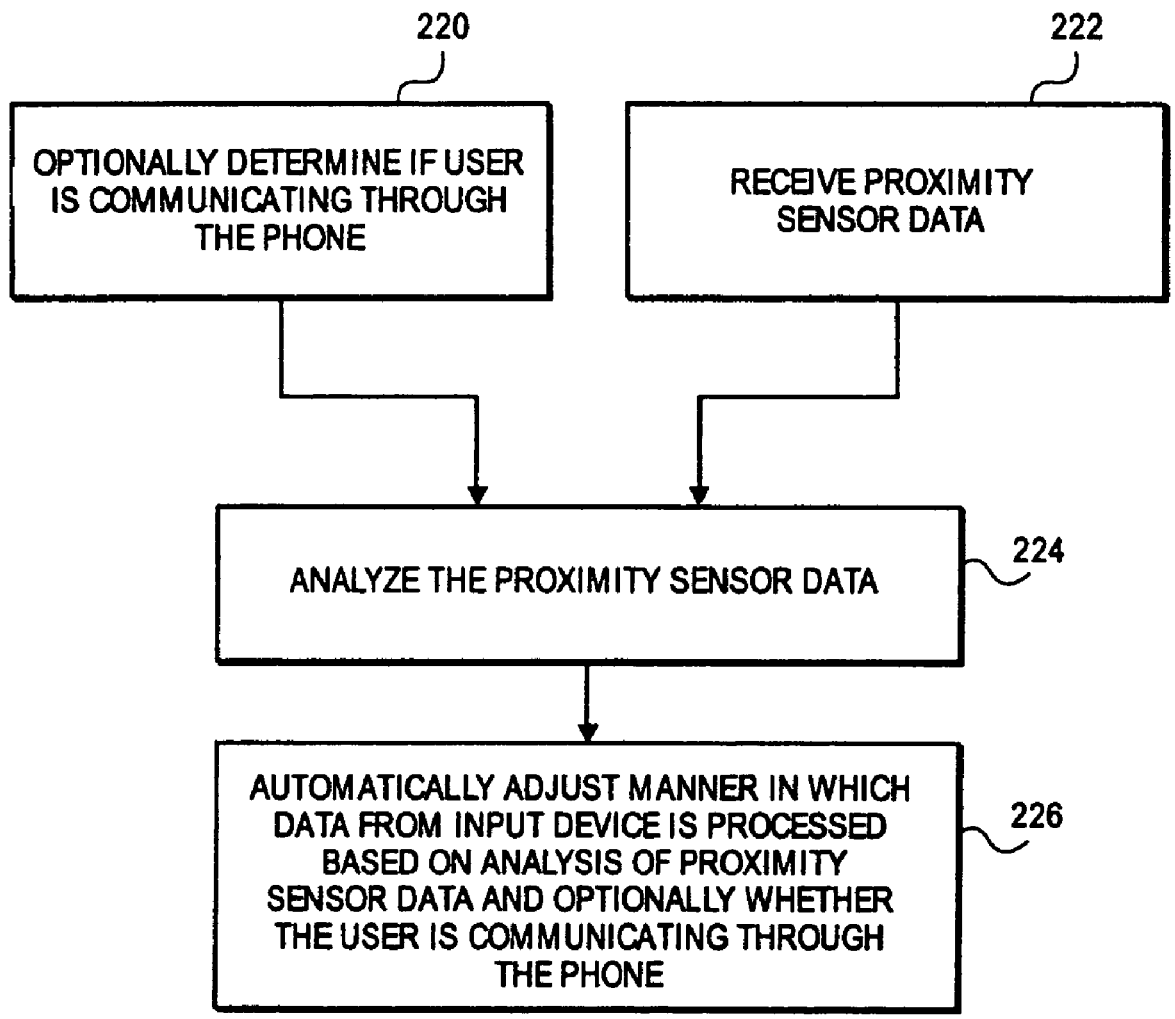
FIGS. 11A-F are flow charts of combinations of sensing to determine user activity and performing automated responses in accordance with embodiments of the present invention.

AI logic of FIG. 8 performs an AI (artificial intelligence) process. In certain embodiments, the AI process may be performed without a specific, intentional user input or without user inputs having predetermined data associated therewith (e.g., key inputs). The artificial intelligence process performed by the AI logic of FIG. 8 may use a variety of traditional AI logic processing, including pattern recognition and/or interpretation of data. For example, the AI logic may receive data from one or more sensors and compare the data to one or more threshold values and, based on those comparisons, determine how to interpret the data. In one embodiment, a threshold value may represent a distance which is compared to a value derived from a light intensity measurement in a proximity sensor. A light intensity measurement which represents a distance larger than the threshold value indicates that the object (which reflected the emitter's light) is not near, and a light intensity measurement which represents a distance smaller than the threshold value indicates that the object is near. Further, the input data may be subject to at least two interpretations (e.g. the data from a proximity sensor indicates that the user's head is near to the sensor, so turn off the back light, or the data from the proximity sensor indicates the user's head is not near, so leave the backlight under the control of a display timer), and the AI process attempts to select from the at least two interpretations to pick an interpretation that predicts a user activity. In response to the interpretation (e.g. the selection of one interpretation), the AI logic causes an action to be performed as indicated in FIG. 8, wherein the action may modify one or more settings of the device. In at least certain embodiments, the AI logic may perform an AI process which interprets the data from one or more sensors (which interpretation requires the AI process to select between at least two possible interpretations) and which selects an action (e.g. modifying a setting of the device) based on both the interpretation of the sensor data and the current state of the device; the method shown in FIG. 11A is an example of the use of information about the current state of the device (e.g. whether the user is currently communicating through the telephone in the device) along with an interpretation of sensor data (proximity data in the case of FIG. 11A).

In certain embodiments, the AI process may perform traditional methods of pattern recognition on the sensor data. For example, the rate of change of the distance between the device and the user's ear may have a pattern (e.g. revealing a deceleration as the user moves the device closer to their ear), and this pattern in the rate of change of distance may be detected by a pattern matching algorithm. The phrase "artificial intelligence" is used throughout to mean that a conclusion (whether explicit or implicit) can be drawn from data available from one or more sensors about a mode of usage by the user of the device. This conclusion may or my not be expressed in the device (e.g., "the user is talking on the phone") but it will be mapped to specific actions or settings for the device that would be appropriate if the user was using the device in that way. For example, a telephone may be pre-programmed such that whenever it detects (1) a voice being spoken into the microphone, (2) that the phone is connected to a network, and (3) the proximity sensor is active, then the screen backlight will be dimmed. Such pre-programming may involve simple logic (e.g. simple combinatorial logic), but would nonetheless be within the scope of artificial intelligence as used herein. While learning, statistical analysis, iteration, and other complex aspects of AI can be used with the present invention, they are not required for the basic artificial intelligence contemplated. Likewise, the word "analyze" does not imply sophisticated statistical or other analysis, but may involve observation of only a single threshold or datum.

The AI processing, in at least certain embodiments, may be performed by a processor or processing system, such as digital processing system 103, which is coupled to the one or more sensors that provide the data which form the inputs to the AI process. It will be appreciated that an AI process may be part of one or more of the methods shown in FIGS. 10 and 11A-11F.

In at least certain embodiments, the device, which operates according to any of those methods, may have at least one input device (e.g. a keypad or keyboard or touch input panel) which is designed to receive intentional user inputs (e.g. which specify a specific user entry) in addition to one or more sensors which are distinct and separate from the at least one input device and which sensors are not designed to receive intentional user inputs. In fact, a user may not even be aware of the presence of the one or more sensors on the device.

Figure 9A:
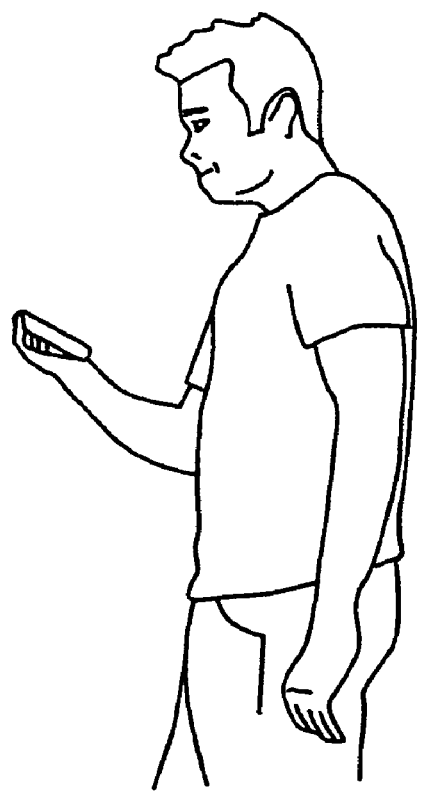
FIGS. 9A-C are views of user activities in accordance with embodiments of the present invention.
Figure 9B:
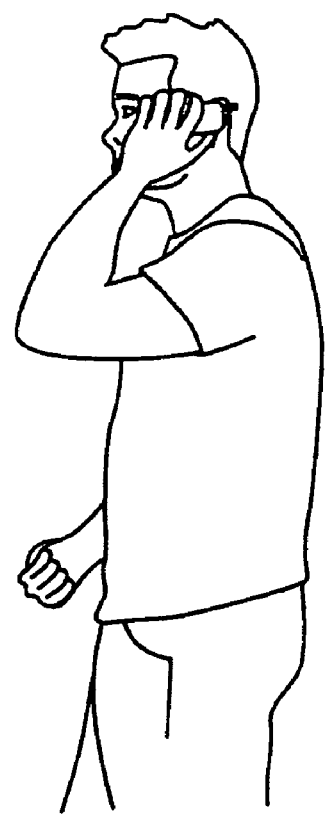
Figure 9C:
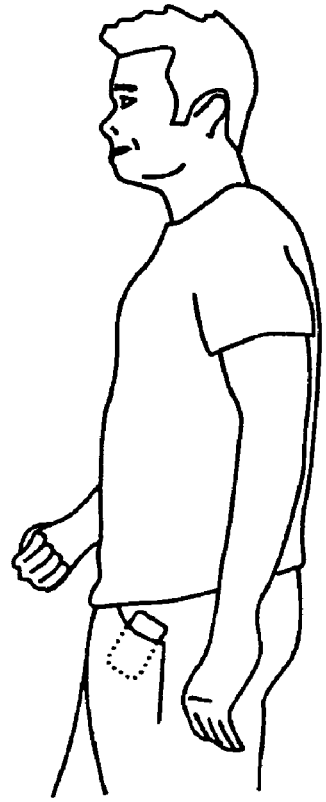

FIGS. 9A-C illustrate exemplary user activities that can be determined based on input data acquired by the one or more sensors of the portable device. Exemplary user activities include, but are not limited to, the user looking directly at the portable device (FIG. 9A), the user holding the portable device at or near their ear (FIG. 9B), the user putting the portable device in a pocket or purse (FIG. 9C), and the like.

Additional information about user activities and/or gestures that can be monitored in accordance with embodiments of the present invention are disclosed in U.S. patent application Ser. No. 10/903,964, titled "GESTURES FOR TOUCH SENSITIVE INPUT DEVICES," filed Jul. 30, 2004, U.S. patent application Ser. No. 11/038,590, titled "MODE-BASED GRAPHICAL USER INTERFACES FOR TOUCH SENSITIVE INPUT DEVICES," filed Jan. 18, 2005, all of which are incorporated herein by reference in their entirety.

Figure 10:
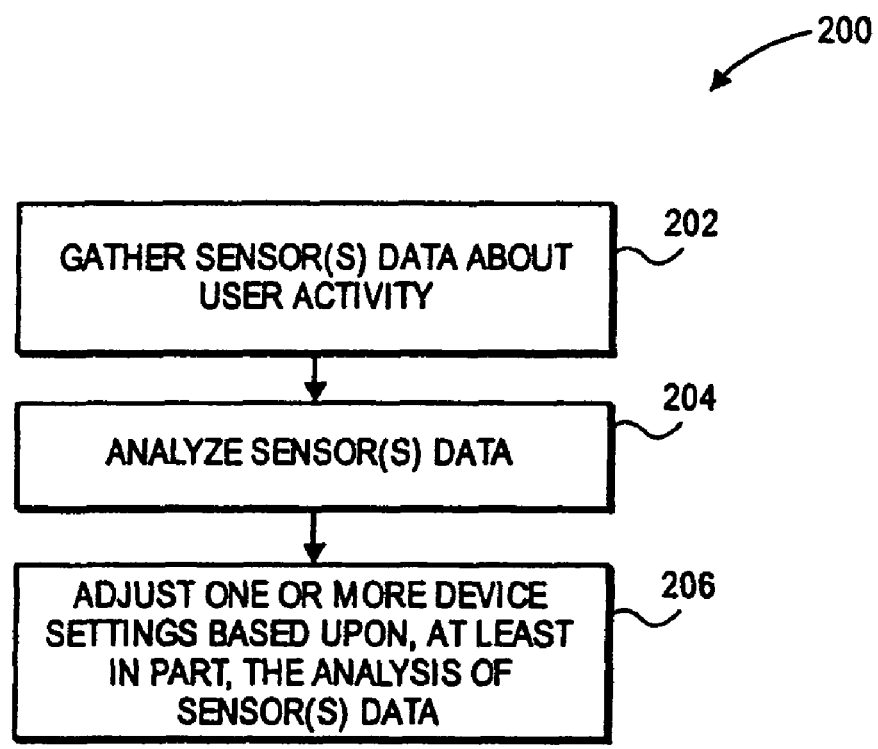
FIG. 10 is a flow chart of a method that includes automated responses to user activity in accordance with embodiments of the present invention.

FIG. 10 is a flowchart illustrating a method 200 for automatically responding to certain user activities with respect to a portable device. In one embodiment, method 200 includes, but is not limited to, gathering sensor data designed to indicate user activity with respect to a portable device, and executing machine-executable code to perform one or more predetermined automated actions in response to the detection of the user activity.

The method 200 may be performed by any one of the devices shown in FIGS. 2, 3, 4, 5A, 5B, 6 and 12 and may or may not use the artificial intelligence process shown in FIG. 8. Operation 202 gathers sensor data, from one or more sensors; the sensor data provides information about user activity. For example, a proximity sensor may indicate whether the device is near the user's ear; a temperature sensor, an ambient light sensor (or a differential ambient light sensor) and a proximity sensor may together indicate that the device is in the user's pocket; a gyroscope and a proximity sensor may together indicate that the user is looking at the device. In operation 204, the data from the one or more sensors is analyzed; this analysis may be performed by one or more processors within the device, including a processor within one or more of the sensors. The analysis attempts to predict user activity based on the sensor data. It will be appreciated that a prediction from this analysis may, in some cases, be wrong. For example, if a user places a finger over a proximity sensor when the user holds the device, this may cause the analysis to incorrectly conclude that the device is near the user's head or ear. In operation 206, one or more device settings may be adjusted based upon, at least in part, the analysis of the data from the one or more sensors. This adjusting may include changing an illumination setting of the device or other actions described herein.

FIGS. 11A-F illustrate exemplary methods for sensing data and automatically responding to the sensed data, and these methods may be performed by any one of the devices shown in FIGS. 2, 3, 4, 5A, 5B, 6 and 12 and may or may not use the artificial intelligence process shown in FIG. 8. It will be appreciated that several variations can be made to the illustrated methods, including variations to the data sensed, analysis of the data and the response(s) to the sensed data.

The method of FIG. 11A includes optional operation 220 in which the device determines if the user is communicating through the telephone within the device. This may be performed by conventional techniques known in the art which can sense when a telephone call is in progress or when the user is otherwise communicating through the telephone or other communication device. In operation 222, proximity sensor data is received from one or more proximity sensors on the device. Then in operation 224, the proximity sensor data is analyzed. For example, the data is analyzed to determine whether an object, such as the user's ear or head, is near the device. This analysis is used to decide whether and how to adjust the device's settings as shown in operation 226. One or more settings of the device may be automatically adjusted based on the analysis of the proximity sensor data and optionally based on whether or not the user is communicating through the telephone or other communication device. For example, if the proximity sensor indicates that the device is near the user's head or ear and it has been determined that the user is communicating through the telephone, then the device determines that the user is talking or otherwise communicating on the telephone or other communication device by having the device next to the user's ear as shown in FIG. 9B. In this situation, the device automatically changes the manner in which data from one or more input devices is processed, such as suppressing a user's ability to make intentional inputs on an input device, such as a keypad or a touch input panel on the device. In addition to suppressing intentional inputs, the device may automatically adjust a power setting of one or more displays of the device. If, on the other hand, the device determines that the user is not communicating though the telephone while the proximity sensor data indicates that an object is near to the device, the device may decide not to modify an illumination setting of the display and to not suppress the user's ability to enter intentional user inputs on an input device. The suppressing of inputs may occur in one of a variety of ways. for example, inputs may be suppressed by turning off or reducing power to the input device such that it is not operational while in this mode; in another example, inputs may be suppressed while in this mode by not processing any inputs which are received by a fully powered input device; in yet another example, inputs are not processed as intentional inputs but are processed to confirm they are "blobs" resulting from touches or near touches on the input device. In the last example, even though an input appears to be an activation of a key (the "3" button on a keypad) or other user interface item, the input is not processed as an activation of that key but rather is processed to determine whether it is a "blob."

Figure 11B:
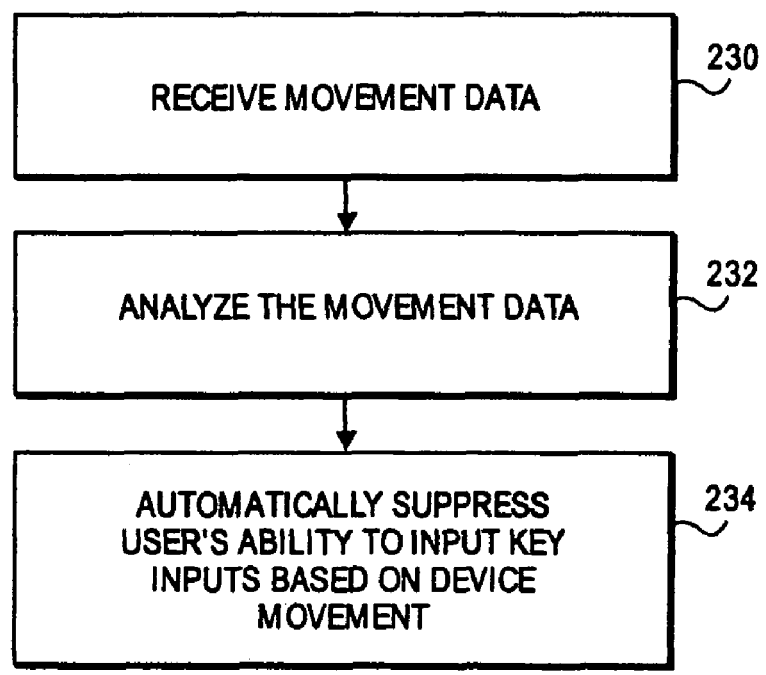

FIG. 11B shows a method of an embodiment of the present inventions which relates to a technique for controlling when data from an input device is processed as an input and when it is ignored as an intentional user input. In operation 230, the device receives movement data from one or more sensors. These sensors may include an accelerometer or a motion sensor or other types of sensors which indicate movement data. These sensors may be designed to distinguish between rapid movements and slow movements. This is particularly true if the movements involve high levels of acceleration. It is assumed in this embodiment that rapid movements may be so rapid that it is unlikely the user could be intending to enter a user input and hence the device may decide to ignore inputs which occur when such sensors indicate that the movement is faster than a threshold movement value. The movement data is analyzed in operation 232 to determine whether or not to automatically suppress a user's ability to input key inputs or other inputs based on the device's movement. In operation 234, the device may automatically suppress a user's ability to enter inputs on an input device in response to the analysis in operation 232.

Figure 11C:
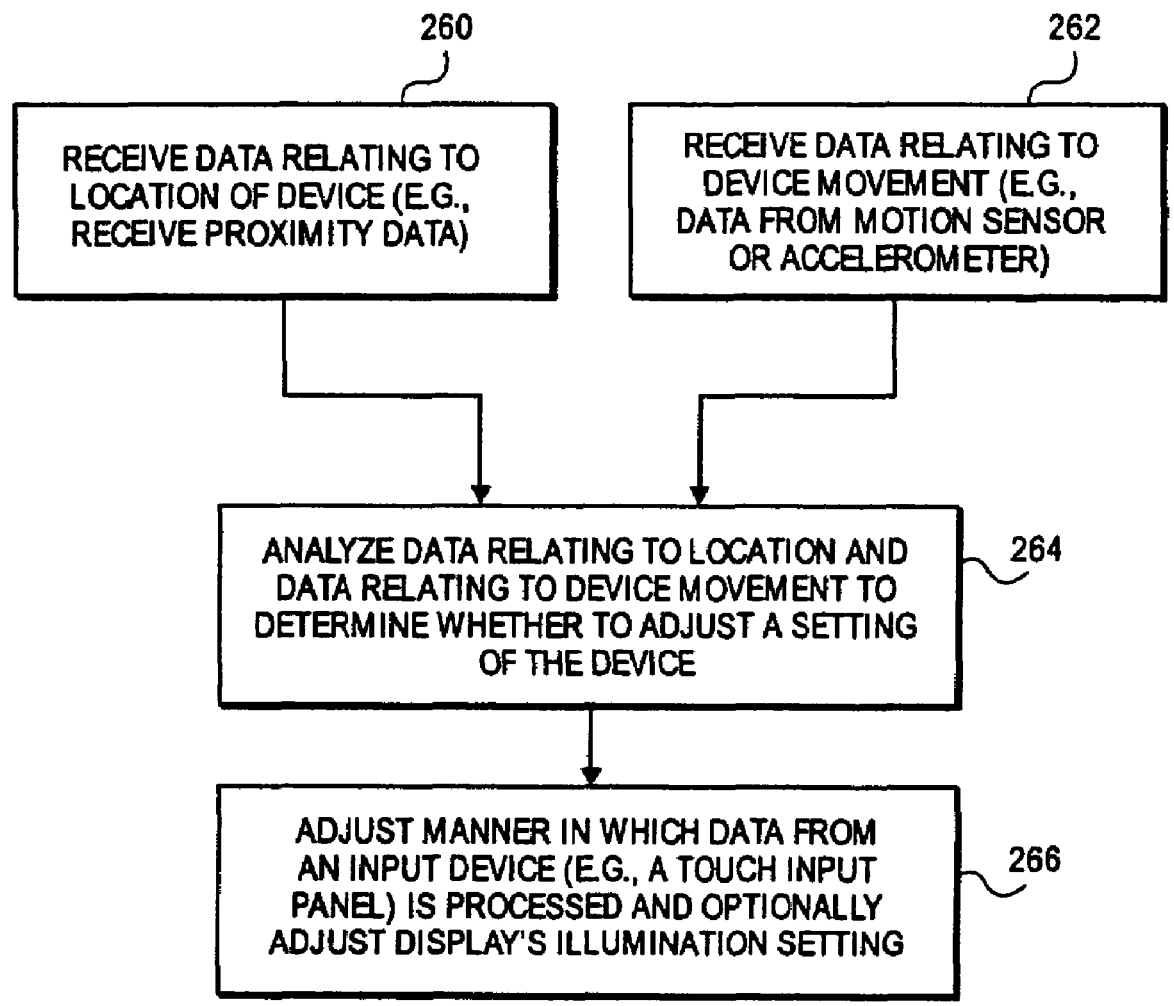

FIG. 11C relates to an embodiment of the present inventions in which data relating to a location of the device and data relating to movement of the device are analyzed to determine whether or not to adjust one or more settings of the device. In operation 260, data relating to the location of the device is received; this data may, for example, be provided by a proximity sensor. In operation 262, data relating to device movement is also received. This data may be from a motion sensor or from an accelerometer. In operation 264, the data relating to location and the data relating to device movement are analyzed to determine whether or not to adjust a setting of the device. This analysis may be performed in a variety of different ways. For example, the data relating to device motion may show a pattern of movement which matches the movement which occurs when a user moves the device from the user's pocket to the user's head. The analysis may further determine that the proximity data or other data relating to location showed that the device was not near the user's head or another object until near the end of the movement. In such a situation, the analysis would determine that the user has pulled the device from their pocket and placed it against the user's ear. In operation 266, one or more settings of the device are adjusted automatically, without any intentional user input, based upon the analysis. For example, an adjustment may be made in the manner in which data from an input device, such as a touch input panel, is processed. For example, inputs to the input device are not processed as intentional user inputs, effectively suppressing the inputs. In addition, a display's illumination setting may be adjusted. For example, if the analysis of operation 264 determines the user has moved the device from a location away from the ear to a location close to the ear then, in one embodiment, an illumination setting may be adjusted and the user's ability to enter intentional inputs into an input device may be suppressed.

Figure 11D:
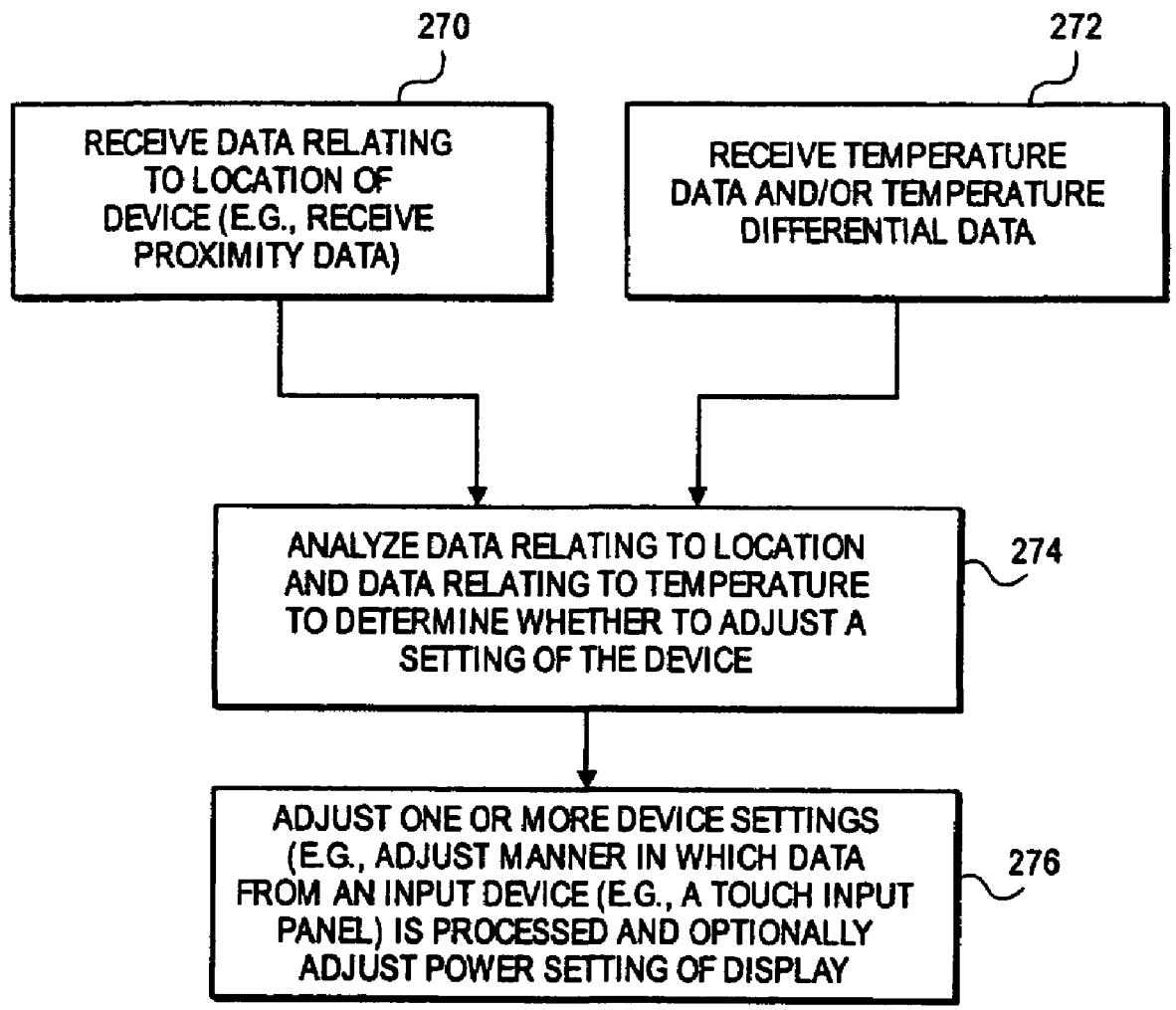

FIG. 11D shows an embodiment of the present inventions in which data relating to location and data relating to temperature is processed through an analysis to determine whether or not to adjust one or more device settings of the device. In operation 270, data relating to location, such as data from a proximity sensor, is received. In operation 272, data relating to temperature, such as temperature data or temperature differential data, is received. In operation 274, the data relating to location and the data relating to temperature are analyzed to determine whether to adjust one or more settings of the device. In operation 276, one or more device settings are adjusted in response to the analysis of operation 274.

Figure 11E:
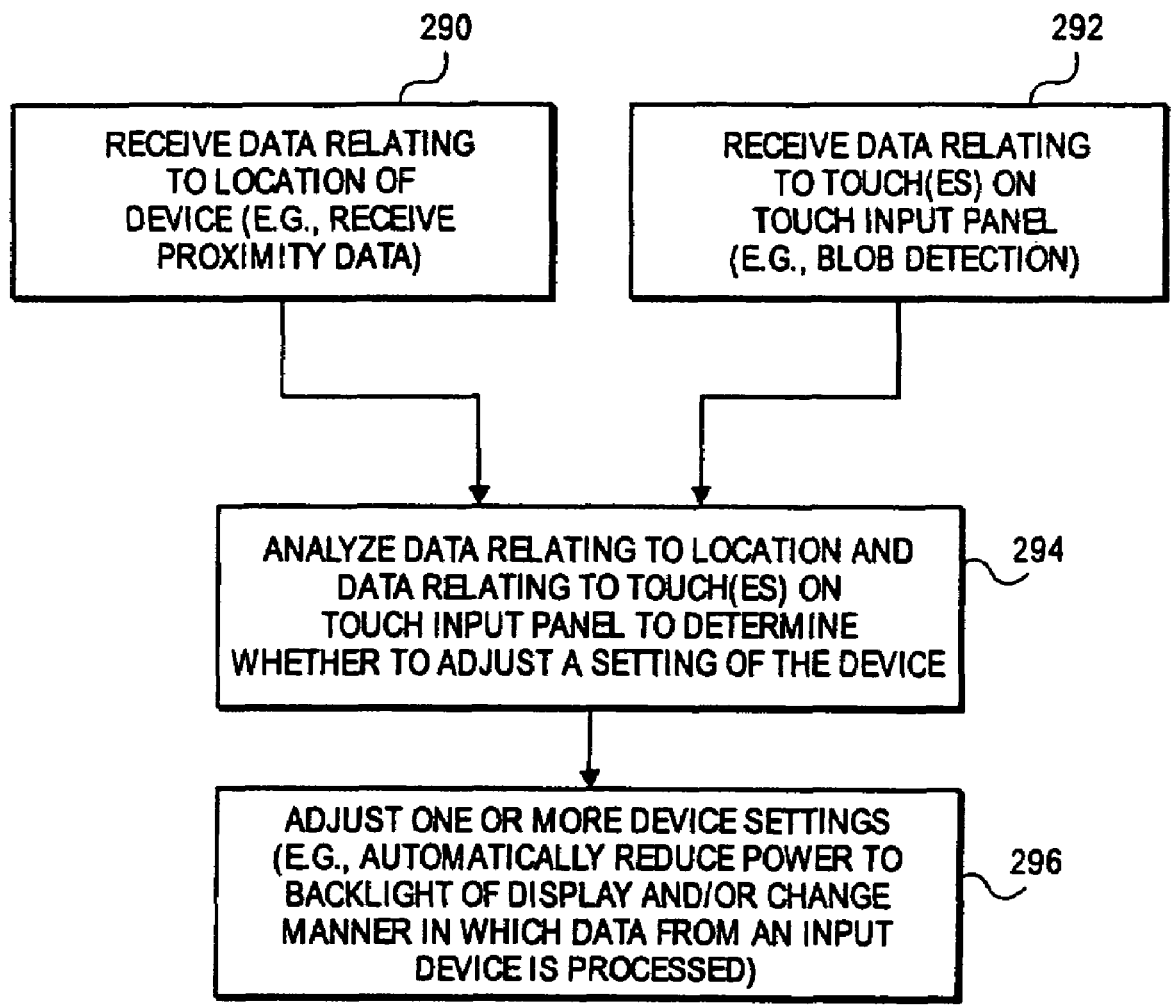

FIG. 11E shows an embodiment of the present inventions in which data relating to location of a device and data relating to touches on a touch input panel of the device are analyzed to determine whether to adjust a setting of the device. In this embodiment, data relating to location of the device is received in operation 290 and data relating to touches on a touch input panel is received in operation 292. The data relating to location may be from a proximity sensor. The data relating to touches on a touch input panel may be from a multi-point touch input panel which is capable of detecting multiple point touches which may occur when a user's face is pressed against or is otherwise near the touch input panel. In operation 294, the data relating to location and the data relating to touches are analyzed to determine whether to adjust a setting of the device. As a result of this analysis, in operation 296, one or more device settings are adjusted. For example, the adjustment may include automatically reducing power to the backlight of a display or changing the manner in which data from the touch input panel is processed, or both adjustments.

A mode of the device may be used in order to determine whether to or how to adjust a setting of the device. The mode of the device may include any one of a variety of modes or conditions, such as speakerphone mode or non-speakerphone mode, battery powered mode or not battery powered mode, call waiting mode or not call waiting mode, an alert mode in which the device may make a sound, such as the sound of an alarm, etc. The data relating to user activity (e.g. data from one or more sensors, such as a proximity sensor and/or a touch input panel, which is capable of detecting blobs from a face) is analyzed relative to the mode of the device and the analysis attempts to determine whether to adjust a setting of the device. One or more device settings may be adjusted based on the sensed user activity and the device-mode. For example, the device may automatically switch from speakerphone mode to non-speakerphone mode when proximity data, and optionally other data (e.g. data from a motion sensor and an ambient light sensor) indicate the user has placed the device, which in this case may be a telephone, next to the user's ear. In this example, the device has automatically switched from speakerphone mode to non-speakerphone mode without any intentional input from the user which indicates that the switch should occur. Another method involves adjusting an alert or alarm volume depending on whether or not the device is near to the user's ear. In this example, if the data relating to user activity indicates that the device is adjacent to the user's ear and if the mode of the device is set such that alarms or alerts will cause the device to make a sound, then the device will automatically change the volume level for an alert or an alarm from a first level to a second level which is not as loud as the first level.

Figure 11F:
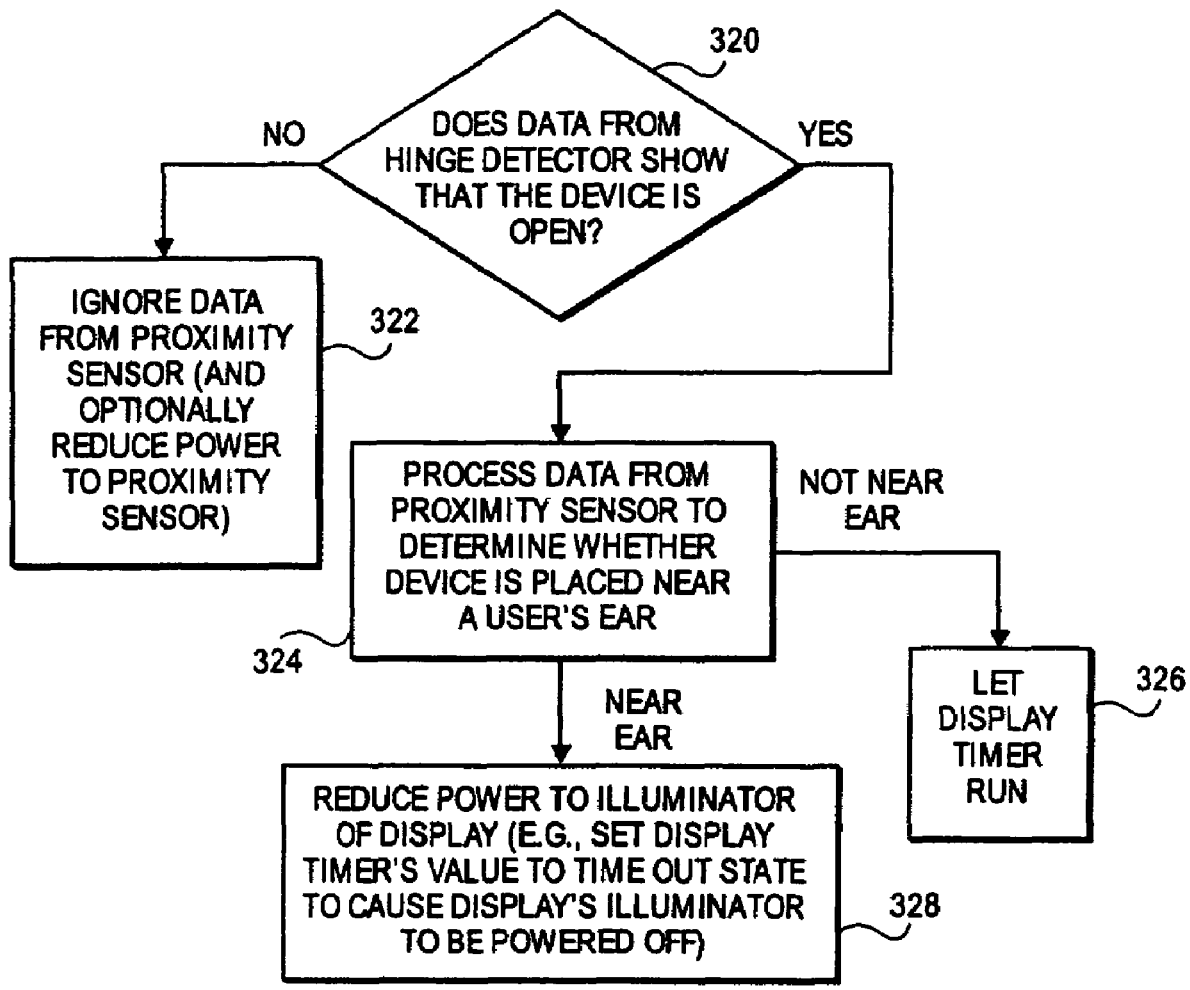

FIG. 11F shows an embodiment of the inventions in which data from a device configuration detector, such as a hinge detector, is used to determine how to process data from one or more sensors on the device. In one embodiment, this method shown in FIG. 11F may be used with the device shown in FIGS. 5A and 5B (and the proximity sensor referred to in FIG. 11F may be proximity sensor 84 in FIG. 5A). In particular, a hinge detector which is coupled to the hinge 87 may detect whether the device is open as shown in FIG. 5A or closed as shown in FIG. 5B. Other configuration detectors may indicate whether a slide out input device (e.g. a slide out keyboard) or other type of input device has been pulled out (or swung out) or not from a portion of the device. In operation 320, the device determines whether data from a hinge detector shows that the device is open. If the device is not open, then in operation 322, data from a proximity sensor is ignored if the proximity sensor is disposed on an interior surface of the device. Optionally, the power to the proximity sensor may be reduced by, for example, turning off the proximity sensor when the device is in a closed state. If it is determined in operation 320 that the device is open, then in operation 324, data from the proximity sensor is processed to determine whether the device is placed near an object, such as the user's ear. If it is determined from the processing of operation 324 that the device is not near the user's ear, then a display timer, which controls the time that the display is illuminated, is allowed to continue to run in operation 326. This display timer may be similar to a conventional display timer which begins counting down to a time out state in response to activating a backlight of a display. The display timer counts down to a time out state and, if no input resets the timer to its starting value while it counts down, then the timer reaches its time out state and causes, in response to the time out state, the display's backlight to be powered off (or otherwise have its power consumption state reduced). If, in operation 324, it is determined that the device is near the user's ear, then in operation 328, power to an illuminator of the display is reduced. This may be performed by setting the display timer's value to a time out state to thereby cause the display's illuminator to be powered off. It will be appreciated that the method of FIG. 11F may save additional battery life by reducing power to the illuminator of the display before the display timer runs out.

It will be appreciated that a method which uses a display timer, such as those known in the art, may be used in addition to at least certain embodiments of the inventions which adjust illumination settings. For example, in the embodiment shown in FIG. 11A, a display timer which has been started may continue to count while the method shown in FIG. 11A is performed. The display timer will count, while the method of FIG. 11A is being performed, until its time out state is reached and, upon doing so, the display timer may cause the illumination setting to be changed before the method of FIG. 11A is completed. In this case, the illumination setting is controlled by both the display timer and one or more sensors of at least certain embodiments of the inventions which cause an adjusting of illumination settings based upon the analysis of data from one or more sensors.

The phrase "proximity sensor" is used throughout to mean a sensor, such as a capacitive, temperature, inductive, infrared or other variety of sensor, which is capable of detecting whether an object is present within a certain distance of the sensor. A primary object of this detecting may be the head of the user (or any other object that would present viewing of the display screen).

Any of the embodiments of the inventions may include one or more user interface controls which allow a user to override a result caused by one or more sensors. For example, a control, such as a button, may be pressed by the user to cause the display to return to full power after a proximity sensor has caused the display to enter a reduced power consumption state. In another example, the user interface control may be a sensor (or group of sensors), such as an accelerometer, which detects a user interaction with the device (e.g. shaking the device), and the user interaction has been set up to cause an overriding of a state caused by one or more sensors.

Certain embodiments of the inventions may employ one or more light sensors which provide data relating to light, which data is analyzed to determine whether or not to adjust one or more settings of a device, such as wireless device 100. Ambient light level data may be provided by an ambient light sensor which indicates the level of light intensity surrounding that sensor. Ambient light differential data may be obtained from two or more ambient light sensors which are disposed at different positions on the device. For example, one ambient light sensor may be on one side of the device, and another ambient light sensor may be on another side of the device. A different in the light intensity levels may be determined by comparing the data from these two ambient light sensors on two different sides or surfaces of the device. There are a variety of possible uses of a light sensor. A light sensor may be used with a proximity sensor to determine when a device is placed in a pocket to cause the device to be set in vibrate mode only or vibrate mode with audible ringing. In another example, in response to a light sensor determining that the ambient light is very low, and optionally in response to a user having set the device to visibly light up to show an incoming call when the ambient light is very low, the device may automatically be put in a "light ring" mode when it is dark so that instead of an audible ring from the device, the display flashes visibly (e.g. by repeatedly turning on and off the backlight) to indicate an incoming call. Another exemplary use of a light sensor involves using it as an alarm indicating that a dark room (or environment) has become brighter (e.g. the sun has risen or a door to a darkened room is opened to let light into the room). A light sensor may also be used to cause a device to automatically act as a source of light (e.g. as a flashlight, in effect) upon sensing a low ambient light level.

Figure 12:
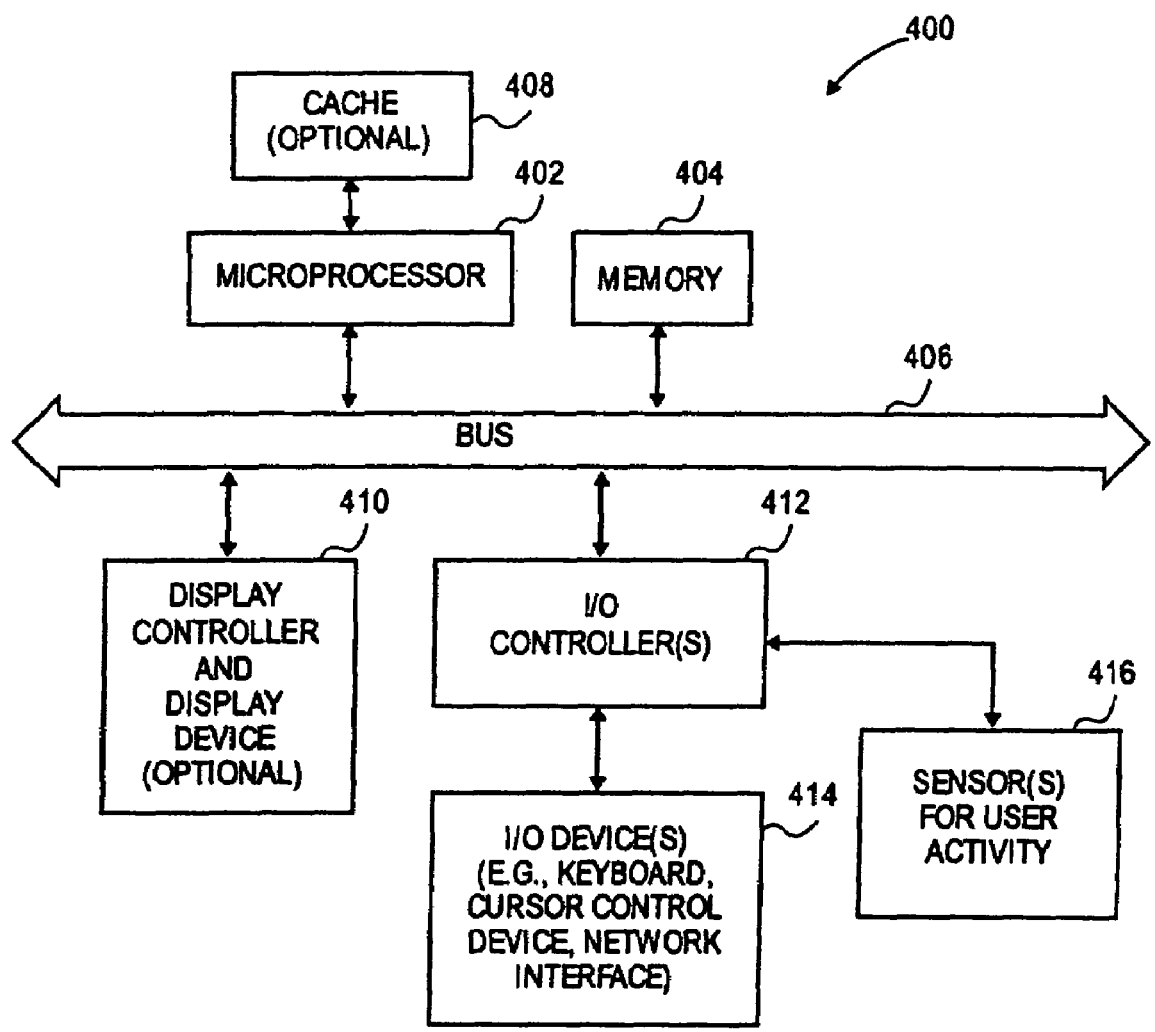
FIG. 12 is a block diagram of a digital processing system in accordance with one embodiment of the present invention.

FIG. 12 shows another example of a device according to an embodiment of the inventions. This device may include a processor, such as microprocessor 402, and a memory 404, which are coupled to each other through a bus 406. The device 400 may optionally include a cache 408 which is coupled to the microprocessor 402. This device may also optionally include a display controller and display device 410 which is coupled to the other components through the bus 406. One or more input/output controllers 412 are also coupled to the bus 406 to provide an interface for input/output devices 414 and to provide an interface for one or more sensors 416 which are for sensing user activity. The bus 406 may include one or more buses connected to each other through various bridges, controllers, and/or adapters as is well known in the art. The input/output devices 414 may include a keypad or keyboard or a cursor control device such as a touch input panel. Furthermore, the input/output devices 414 may include a network interface which is either for a wired network or a wireless network (e.g. an RF transceiver). The sensors 416 may be any one of the sensors described herein including, for example, a proximity sensor or an ambient light sensor. In at least certain implementations of the device 400, the microprocessor 402 may receive data from one or more sensors 416 and may perform the analysis of that data in the manner described herein. For example, the data may be analyzed through an artificial intelligence process or in the other ways described herein. As a result of that analysis, the microprocessor 402 may then automatically cause an adjustment in one or more settings of the device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An apparatus to sense proximity and to sense light, the apparatus comprising:
    an emitter of electromagnetic radiation;
    a detector of electromagnetic radiation, the detector having a sensor configured to detect electromagnetic radiation from the emitter when the apparatus is sensing proximity and configured to detect electromagnetic radiation from a source other than the emitter when the apparatus is sensing light, wherein the emitter is configured to emit IR light modulated with a first waveform at a first frequency, and further comprising:
    processing logic to distinguish between IR light modulated with the first waveform or at the first frequency and ambient IR light when the apparatus is sensing proximity.

2. The apparatus of claim 1 further comprising:
    processing logic coupled to the emitter and to the sensor, the process logic configured to subtract the radiation from the source other than the emitter when the apparatus is sensing proximity.

3. The apparatus of claim 1 wherein the processing logic to distinguish comprises processing logic to one of time division multiplex, timeslice multiplex, frequency filter, and passband filter between IR light modulated by the first waveform or at the first frequency and ambient IR light when the apparatus is sensing proximity.

4. The apparatus of claim 1 further comprising:
    processing logic coupled to the emitter and to the detector, the processing logic configured to turn off the radiation from the emitter when the apparatus is sensing light.

5. The apparatus of claim 4 wherein the sensor is a first sensor having a first bandpass filter that only passes infra-red (IR) light, the detector further comprising:
    a second sensor having a second passband filter that only passes both IR light and visible light.

6. The apparatus of claim 5 wherein the second passband filter is a cover over the first sensor and the second sensor, and further comprising:
    processing logic to scale and subtract ambient IR light detected by the first sensor from ambient visible light and ambient IR light detected by the second detector when the apparatus is sensing light.

7. The apparatus of claim 1, wherein the electromagnetic radiation from a source other than the emitter comprises an ambient IR light level and comprises ambient light levels at wavelengths other than IR.

8. The apparatus of claim 1, further comprising a mechanical shutter or electrical shutter placed over the emitter to disable the emitter.

9. The apparatus of claim 1, further comprising a power source coupled to the emitter, and a switch to disconnect the power source from the emitter to disable the emitter.

10. An apparatus to sense proximity and to sense light, the apparatus comprising:
    an emitter of electromagnetic radiation;
    a detector of electromagnetic radiation, the detector having a first sensor configured to detect electromagnetic radiation from the emitter when the apparatus is sensing proximity, the detector having a second sensor configured to detect electromagnetic radiation from a source other than the emitter when the apparatus is sensing light.

11. The apparatus of claim 10 further comprising:
    processing logic coupled to the emitter and to the detector, the process logic configured to subtract the radiation from the source other than the emitter when the apparatus is sensing proximity, the processing logic configured to one of subtract, turn off, and cover the radiation from the emitter when the apparatus is sensing light.

12. The apparatus of claim 10 wherein the emitter is configured to emit IR light modulated with a first waveform at a first frequency, and wherein the first sensor includes one of a processor, processing logic, a frequency filter, a waveform filter, and a time division multiplexer to distinguish between IR light having the first waveform or at the first frequency and ambient IR light having a different second waveform and at a different second frequency.

13. The apparatus of claim 10 wherein the emitter is configured to emit modulated IR light, wherein the first sensor comprises a first filter having a passband that only passes infra-red (IR) light, and wherein the first sensor comprises a waveform generator and a multiplexer configured to time-slice and multiplex between sensing the ambient IR light and the modulated emitted IR light.

14. The apparatus of claim 10 wherein the first sensor is configured to detect light having one of a modulation frequency of a modulated light signal emitted by the emitter and a waveform of the modulated light signal emitted by the emitter.

15. An apparatus to sense proximity and to detect light, the apparatus comprising:
    an emitter of electromagnetic radiation;
    a detector of electromagnetic radiation, the detector being configured to detect electromagnetic radiation from the emitter when the apparatus is configured to sense proximity, wherein the detector is configured to detect electromagnetic radiation from a source other than the emitter when the apparatus is configured to sense light, and wherein the detector comprises a first sensor having a first bandpass filter that only passes infra-red (IR) light, the detector further comprising:
    a second sensor having a second passband filter that passes both IR light and visible light;
    a fence disposed between the emitter and the detector configured to remove electromagnetic radiation emitted by the emitter.

16. The apparatus of claim 15 further comprising:
    a covering over the emitter and detector; and
    wherein the fence between the emitter and the detector is configured to prohibit electromagnetic radiation from the emitter that is refracted by the covering from entering the detector.

17. The apparatus of claim 15 wherein the covering comprises an anti-glare covering or hardcoat on the outside of the apparatus having refractive properties to cause IR from the emitter to reflect back into the detector, and wherein the fence comprises a non-IR transmissive material configured to prohibit IR light emitted by the emitter and refracted by the cover from reaching the detector.

18. The apparatus of claim 17 wherein the fence extends from a surface the emitter is mounted on to touch the covering.

19. A method of operating a combined sensor to sense proximity and ambient light, the method comprising:
   emitting light from an emitter of the combined sensor when in a proximity mode;
   detecting light from the emitter, the detecting being performed by a sensor of the combined sensor, and the sensor being configured to detect light from the emitter to determine a proximity when in the proximity mode;
   sensing ambient light at the sensor while disabling the emitter from emitting light when in an ambient light sensing (ALS) mode.

20. The method as in claim 19 wherein the sensor comprises:
   a phototransistor;
   an IR light passband filter covering the phototransistor; and
   an IR light and visible light passband filter covering the IR light passband filter.

21. The method as in claim 19 wherein the sensor provides as an output both proximity data and ambient light data and wherein the light from the emitter is an infrared band of wavelengths.

22. The method as in claim 21 wherein the emitter emits light in a predetermined pattern and the detector is coupled to a processor which is configured to detect the predetermined pattern in an output from the detector.

23. The method as in claim 22 further comprising:
   comparing at least one of the proximity data and the ambient light data to at least one threshold value.

24. The method of claim 19, wherein sensing ambient light at the detector while disabling the emitter comprises a sensing an ambient IR light level of ambient light that comprises ambient light levels at wavelengths other than IR.

25. The method of claim 19, further comprising placing a mechanical shutter or electrical shutter over the emitter to disable the emitter.

26. The method of claim 19, further comprising disconnecting a power source coupled to the emitter to disable the emitter.

27. A method of operating a combined sensor to sense proximity and ambient light, the method comprising:
   emitting light from an emitter of the combined sensor;
   detecting light from the emitter, the detecting being performed by a sensor, wherein the sensor is a first sensor having a first bandpass filter that only passes infra-red (IR) light, the detector further comprising:
      a second sensor having a second passband filter that passes both IR light and visible light;
      removing electromagnetic radiation emitted by the emitter using a fence disposed between the emitter and the sensor.

28. The method as in claim 27 further comprising:
   covering the emitter with an IR light refractive cover; and
   prohibiting the IR light emitted by the emitter that is refracted by the cover from entering the sensor.

29. A method of operating a data processing system, the method comprising:
   emitting light from an emitter of a proximity sensor portion of a combined sensor;
   detecting light from the emitter, the detecting being performed in a sensor of the proximity portion and of an overlapping ambient light sensor (ALS) portion of the combined sensor, and the sensor being configured, when sensing proximity, to detect light from the emitter;
   sensing ambient light at the sensor while disabling the emitter from emitting light;
   processing proximity data and ambient light data from the sensor to determine whether to modify a setting of the data processing system.

30. The method as in claim 29 further comprising:
   switching the combined sensor between a proximity mode and an ALS mode;
   emitting modulated light from the emitter when in the proximity mode;
   detecting at a first phototransistor, ambient IR light and modulated light from the emitter reflected by an object when in the proximity mode;
   prohibiting emission of modulated light from the emitter when in the ALS mode;
   detecting at the first phototransistor, ambient IR light when in the ALS mode;
   detecting at a second phototransistor, ambient IR light and ambient visible light when in the ALS mode.

31. The method as in claim 30 further comprising:
   distinguishing the reflected modulated light from the ambient IR light when in the proximity mode;
   determining a proximity of the object from the distinguished reflected modulated light when in the proximity mode;
   scaling the ambient IR light detecting at the first phototransistor to have an intensity equal to an intensity of the ambient IR light detected at the second phototransistor when in the ALS mode;
   subtracting the scaled ambient IR light from the ambient IR light and ambient visible light detected at the second phototransistor to determine a detected visible light when in the ALS mode;
   determining a visible light intensity from the visible light detected when in the ALS mode.

32. The method as in claim 31 wherein determining a proximity comprises comparing the distinguished reflected modulated light to a first threshold value, and wherein determining the visible light intensity comprises comparing the visible light detected to a second threshold value.

33. The method as in claim 32 further comprising:
   decreasing a setting of a display illuminator if the distinguished reflected modulated light is greater than the first threshold value;
   decreasing a setting of a display illuminator if the visible light detected is less than the second threshold value.

34. The method of claim 29, wherein a sensing ambient light at the detector while disabling the emitter comprises sensing an ambient IR light level of ambient light that comprises ambient light levels at wavelengths other than IR.

35. The method of claim 29, further comprising placing a mechanical shutter or electrical shutter over the emitter to disable the emitter.

36. The method of claim 29, further comprising disconnecting a power source coupled to the emitter to disable the emitter.

37. A machine readable medium containing executable program instructions which when executed cause a method of operating a data processing system, the method comprising:
   emitting light from an emitter of a proximity sensor portion of a combined sensor;
   detecting light from the emitter, the detecting being performed in a sensor of the proximity portion and of an overlapping ambient light sensor (ALS) portion of the combined sensor, and the sensor being configured, when sensing proximity, to detect light from the emitter;

sensing ambient light at the sensor while disabling the emitter from emitting light;
processing proximity data and ambient light data from the sensor to determine whether to modify a setting of the data processing system.

38. The medium of claim 37, the method further comprising:
switching the combined sensor between a proximity mode and an ALS mode;
emitting modulated light from the emitter when in the proximity mode;
detecting at a first phototransistor, ambient IR light and modulated light from the emitter reflected by an object when in the proximity mode;
prohibiting emission of modulated light from the emitter when in the ALS mode;
detecting at the first phototransistor, ambient IR light when in the ALS mode;
detecting at a second phototransistor, ambient IR light and ambient visible light when in the ALS mode.

39. The medium of claim 38, the method further comprising:
distinguishing the reflected modulated light from the ambient IR light when in the proximity mode;
determining a proximity of the object from the distinguished reflected modulated light when in the proximity mode;
scaling the ambient IR light detecting at the first phototransistor to have an intensity equal to an intensity of the ambient IR light detected at the second phototransistor when in the ALS mode;
subtracting the scaled ambient IR light from the ambient IR light and ambient visible light detected at the second phototransistor to determine a detected visible light when in the ALS mode;
determining a visible light intensity from the visible light detected when in the ALS mode.

40. The medium of claim 39, wherein determining a proximity comprises comparing the distinguished reflected modulated light to a first threshold value, and wherein determining the visible light intensity comprises comparing the visible light detected to a second threshold value.

41. The medium of claim 40, the method further comprising:
decreasing a setting of a display illuminator if the distinguished reflected modulated light is greater than the first threshold value;
decreasing a setting of a display illuminator if the visible light detected is less than the second threshold value.

42. The method of claim 37, wherein sensing ambient light at the detector while disabling the emitter comprises sensing an ambient IR light level of ambient light that comprises ambient light levels at wavelengths other than IR.

43. The method of claim 37, the method further comprising placing a mechanical shutter or electrical shutter over the emitter to disable the emitter.

44. The method of claim 37, the method further comprising disconnecting a power source coupled to the emitter to disable the emitter.

45. An apparatus to sense proximity and to sense light, the apparatus comprising:
means for emitting IR light when in a proximity mode;
means for detecting reflected IR light of the emitted IR light using a sensor of the combined sensor to determine a proximity when in the proximity mode;
means for sensing ambient light at the sensor while disabling the emitted IR light means when in an ambient light sensing (ALS) mode.

46. The apparatus of 45 wherein the sensor comprises:
means for converting photons into an electrical signal;
means for band passing only IR light to the converting means; and
means for band passing only IR light and visible light to the band passing only IR light means.

47. The apparatus of 45 wherein the sensor comprises:
means for providing as an output both proximity data and ambient light data.

48. The apparatus of 47 wherein the emitting IR light means comprises means for emitting a predetermined pattern of IR light pulses, and the detecting reflected IR light means comprises means for detecting the predetermined pattern.

49. The apparatus of 48 further comprising:
means for comparing at least one of the proximity data and the ambient light data to at least one threshold value.

50. An apparatus to sense proximity and to sense light, the apparatus comprising:
means for emitting IR light, the emitted IR light passing through a cover;
means for detecting reflected IR light of the emitted IR light incident upon the cover using a sensor below the cover, wherein the sensor is a first sensor having a first bandpass filter that only passes infra-red (IR) light, the detector further comprising:
a second sensor having a second passband filter that passes both IR light and visible light;
means for removing the emitted IR light from reaching the sensor, prior to the emitted IR light passing through the cover.

51. The apparatus of 50 wherein the cover comprises means for refracting the emitted IR light passing through a cover, and further comprising:
means for prohibiting the IR light emitted by the emitter that is refracted by the cover from entering the sensor.

52. An combined proximity and ambient light sensor comprising:
a proximity sensor portion including an IR light transmitter to emit IR light and an IR light sensor to detect IR light from the transmitter;
ambient light sensor (ALS) portion including the IR light sensor and an IR light and visual light sensor to sense ambient light while disabling the IR light transmitter.

53. The sensor of claim 52 further comprising:
processing logic to process proximity data and ambient light data from the IR light sensor to determine whether to modify a setting of a data processing system.

54. The sensor of claim 53 further comprising:
a first comparator to compare to compare the IR light in the predetermined pattern with a first threshold; and
a subtractor to subtract the ambient IR light from ambient IR light and ambient visible light detected by a second sensor of the ALS portion.

55. The sensor of claim 52 wherein the IR light transmitter emits IR light in a predetermined pattern, and the IR light sensor detects the IR light in the predetermined pattern during a first period of time and ambient IR light not in the predetermined pattern during a second period of time.

56. The sensor of claim 52, wherein the IR light and visual light sensor senses an ambient IR light level of ambient light that comprises ambient light levels at wavelengths other than IR.

57. The sensor of claim 52, further comprising a mechanical shutter or electrical shutter placed over the emitter to disable the emitter.

58. The sensor of claim 52, further comprising a power source coupled to the emitter, and a switch to disconnect the power source from the emitter to disable the emitter.

59. A method of operating a combined sensor to sense proximity and ambient light, the method comprising:
   using an infra-red (IR) light only sensor to sense a proximity of an object;
   using the IR light only sensor to sense an IR part of ambient light;
   subtracting the IR part of ambient light from IR and visible ambient light sensed using an IR light and visible light sensor.

60. The method as in claim 59 further comprises:
   using the IR light and visible light sensor to sense the IR and visible ambient light.

61. The method as in claim 59 wherein the proximity of an object is sensed during a proximity mode and the IR part of ambient light is sensed during an ambient light sensing (ALS) mode.

62. The method as in claim 59 wherein using an infra-red (IR) light only sensor to sense a proximity of an object further comprises:
   using an IR light emitter to emit emitted IR light;
   using the IR light only sensor to sense the emitted IR light reflected by the object.

* * * * *

UNITED STATES PATENT AND TRADEMARK OFFICE
CERTIFICATE OF CORRECTION

PATENT NO. : 7,714,265 B2
APPLICATION NO. : 11/650117
DATED : May 11, 2010
INVENTOR(S) : Anthony M. Fadell et al.

Page 1 of 1

It is certified that error appears in the above-identified patent and that said Letters Patent is hereby corrected as shown below:

On page 2, in column 2, under "Other Publications", line 8, delete "2300-1042_3-6107951" and insert -- 2300-1041_3-6107951 --, therefor.

On page 2, in column 2, under "Other Publications", line 49, delete "Applicaiotn" and insert -- Application --, therefor.

In column 14, line 20, delete ""bandwith"" and insert -- "bandwidth" --, therefor.

In column 14, line 22, delete "bandwith." and insert -- bandwidth. --, therefor.

In column 18, line 9, delete "subractor" and insert -- subtractor --, therefor.

In column 32, line 52, delete "device-mode." and insert -- device mode. --, therefor.

In column 35, line 36, in Claim 3, delete "timeslice" and insert -- time-slice --, therefor.

In column 37, line 33, in Claim 24, delete "comprises a" and insert -- comprises --, therefor.

In column 38, line 48, in Claim 34, delete "wherein a" and insert -- wherein --, therefor.

In column 40, line 54, in Claim 54, after "to compare" delete "to compare".

Signed and Sealed this
Twenty-fifth Day of October, 2011

David J. Kappos
*Director of the United States Patent and Trademark Office*